Figure 1:
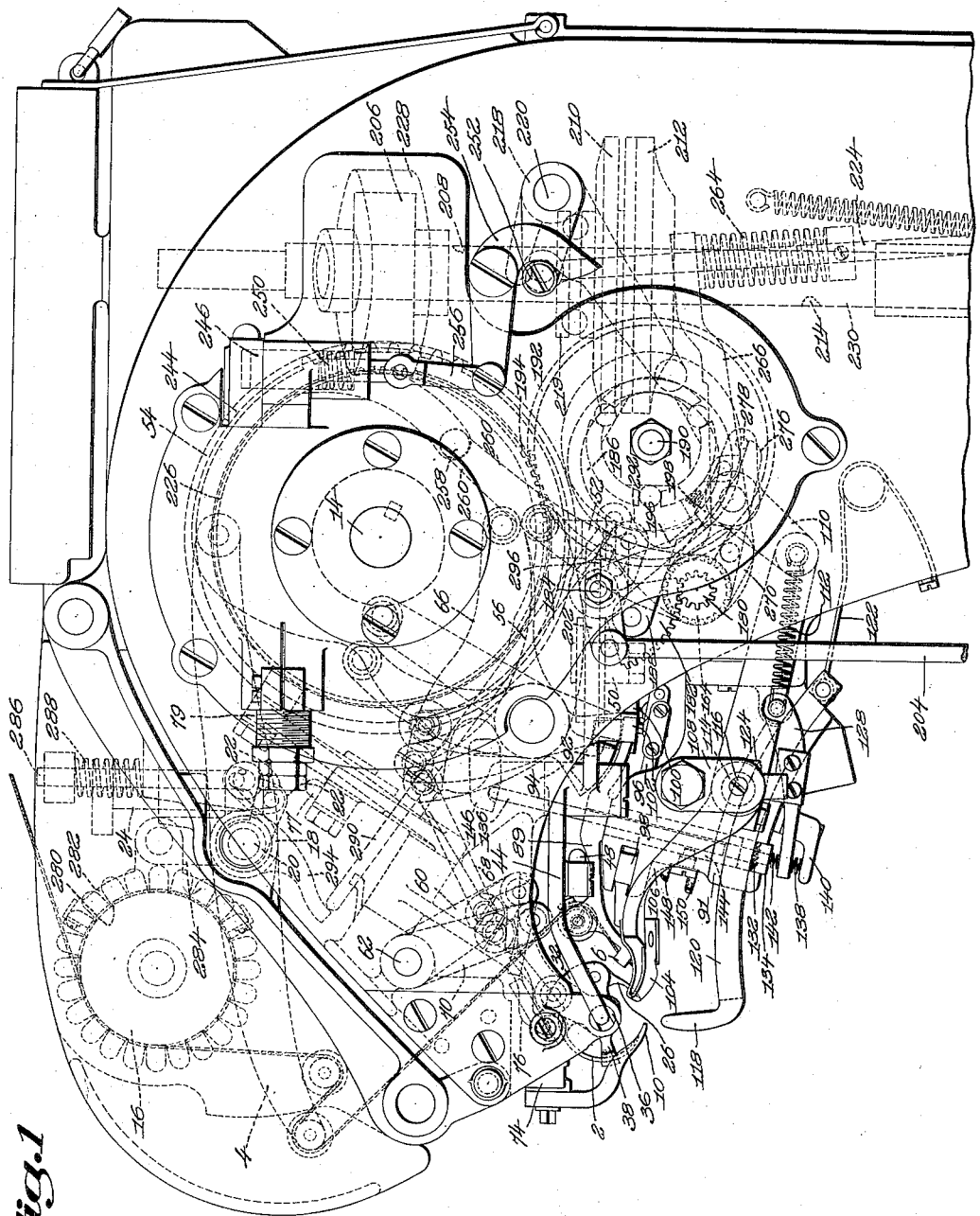

May 26, 1936. A. R. MORRILL 2,041,945
SHOE SEWING MACHINE
Filed March 8, 1933 15 Sheets-Sheet 1

May 26, 1936.   A. R. MORRILL   2,041,945
SHOE SEWING MACHINE
Filed March 8, 1933   15 Sheets-Sheet 3

May 26, 1936.  A. R. MORRILL  2,041,945
SHOE SEWING MACHINE
Filed March 8, 1933   15 Sheets-Sheet 4

Witness
Frederick S. Greenleaf

Inventor
Alfred R. Morrill
by Fish Hildreth
Cary & Jenney Attys.

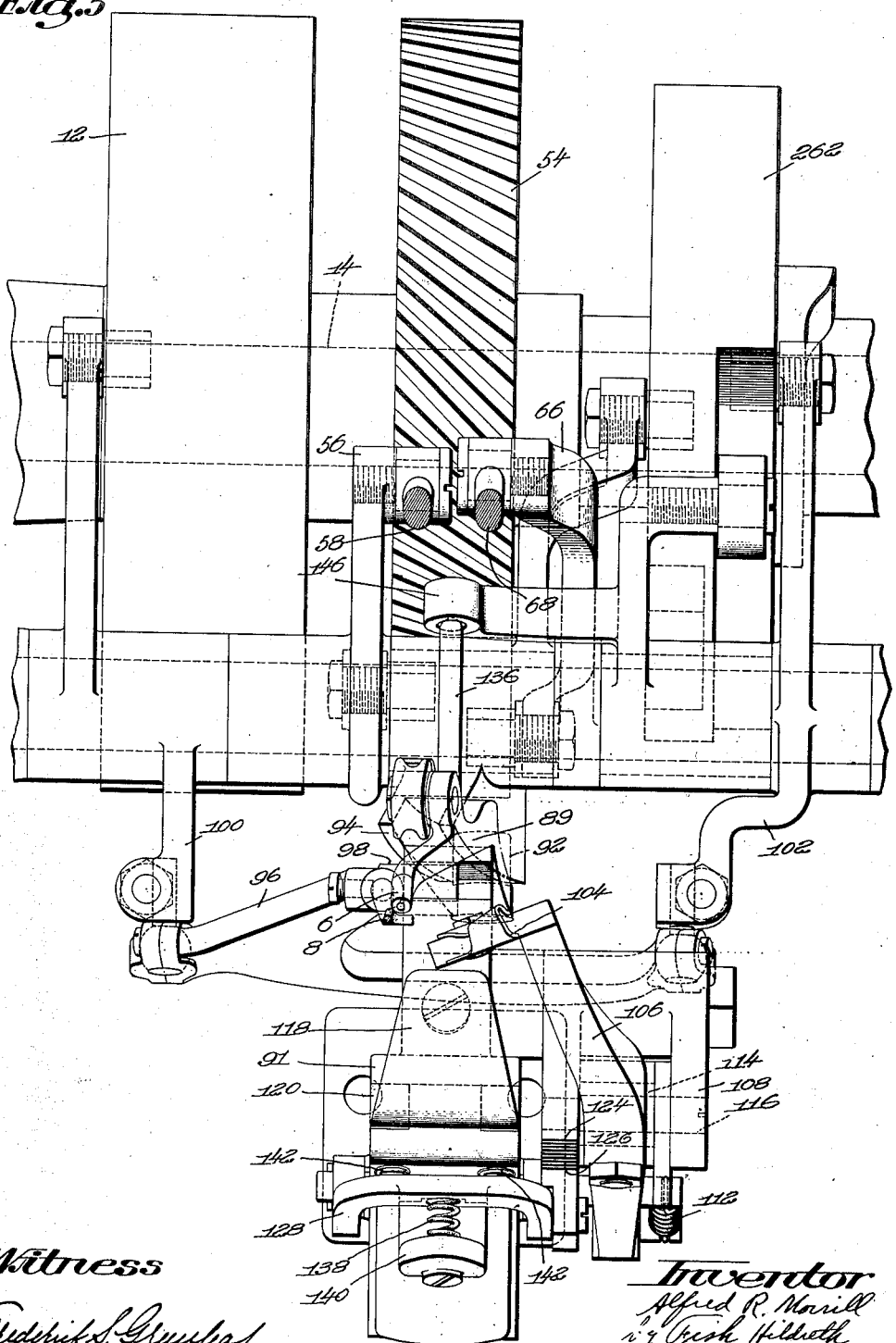

May 26, 1936. A. R. MORRILL 2,041,945
SHOE SEWING MACHINE
Filed March 8, 1933 15 Sheets-Sheet 6
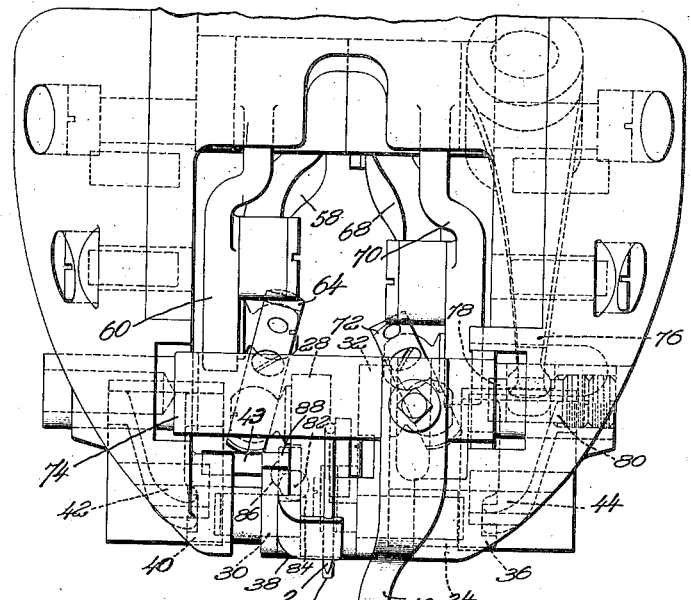
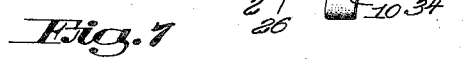
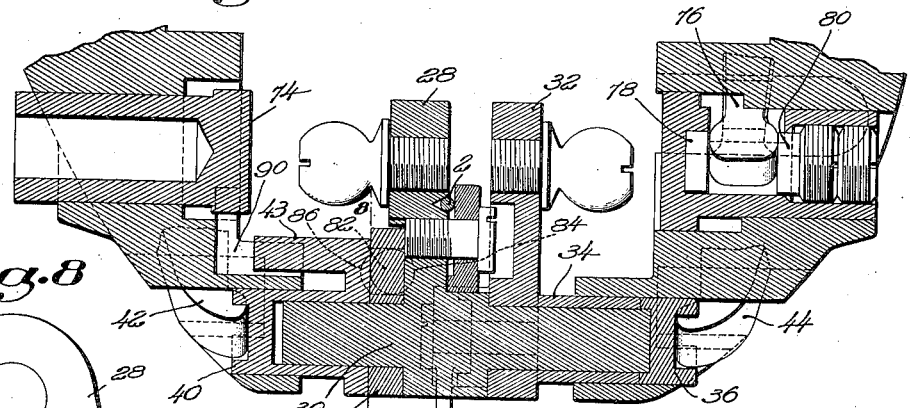
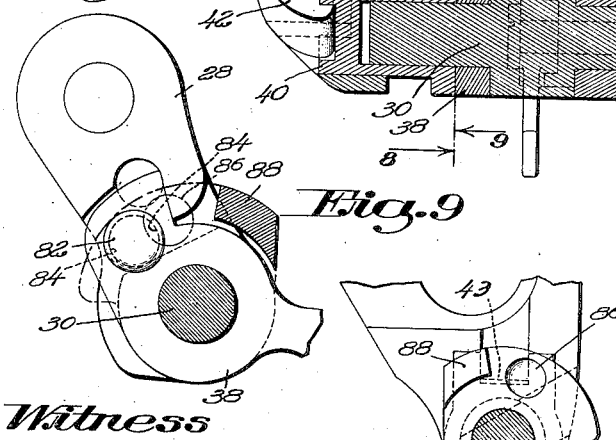
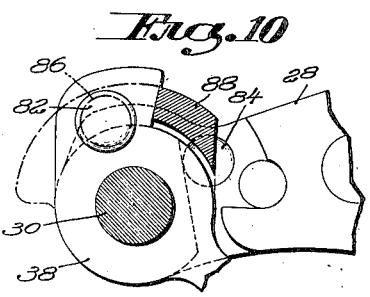

May 26, 1936.  A. R. MORRILL  2,041,945
SHOE SEWING MACHINE
Filed March 8, 1933  15 Sheets-Sheet 7
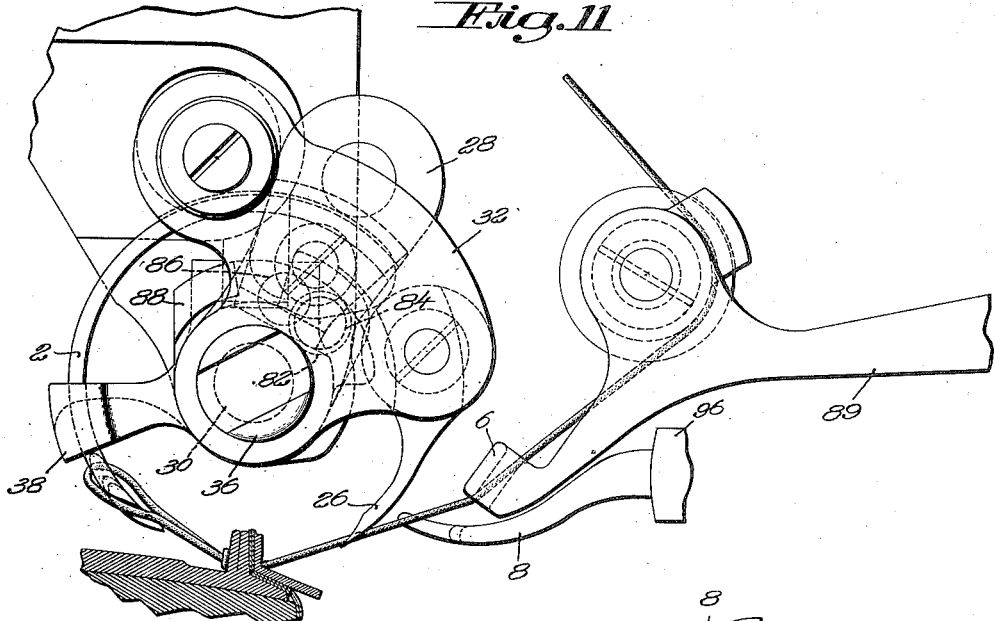
Fig. 11
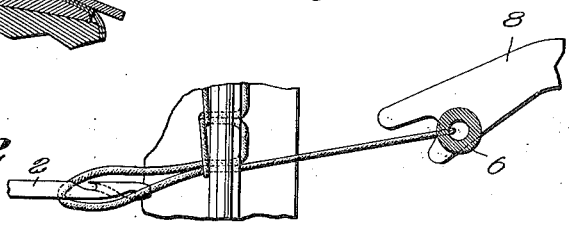
Fig. 12
Fig. 13
Fig. 14
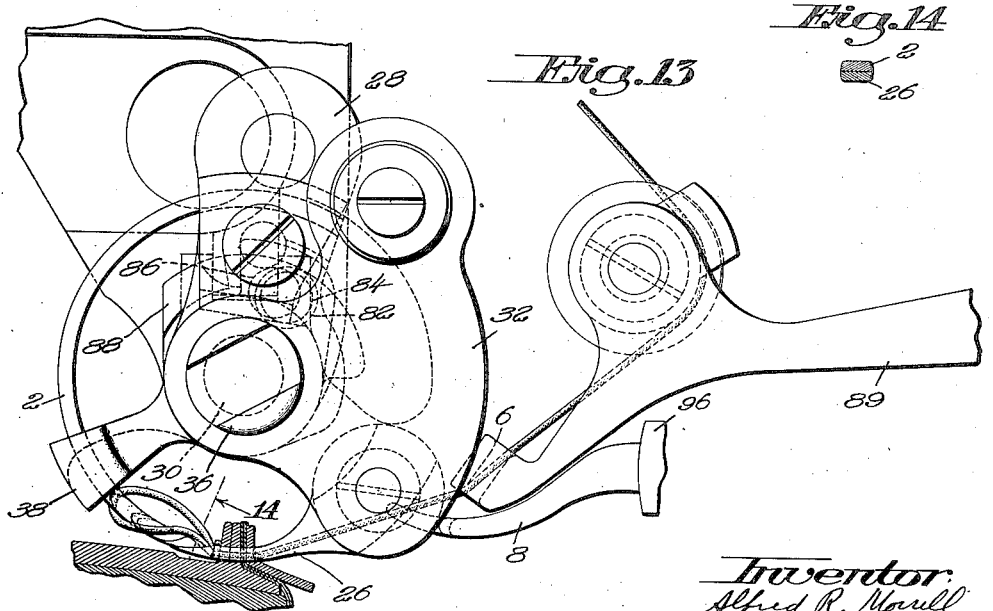
Witness
Frederick S. Greenleaf
Inventor:
Alfred R. Morrill
by Fish Hildreth
Cary & Jenney Attys.

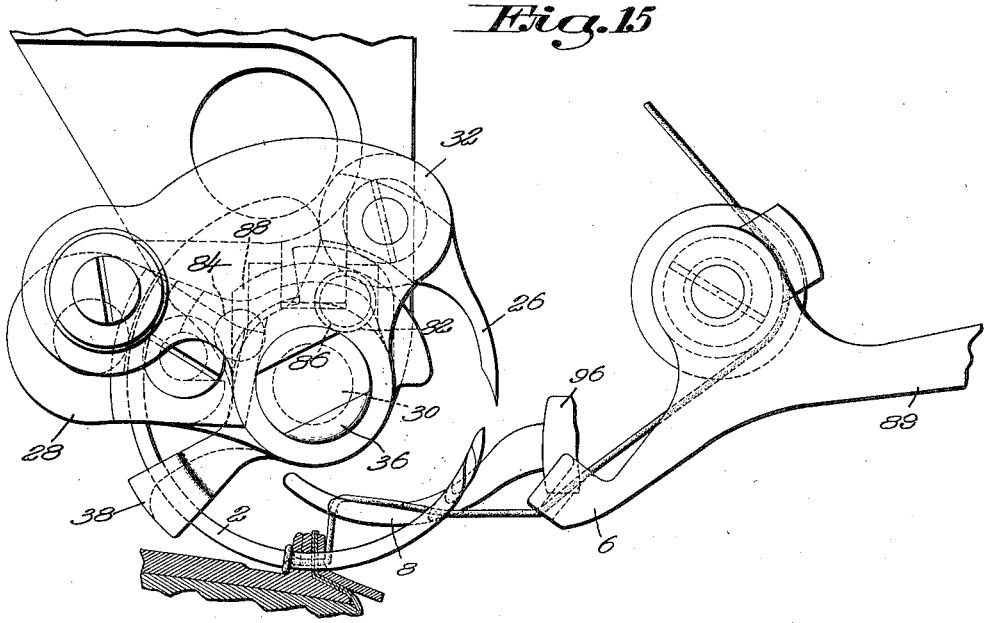
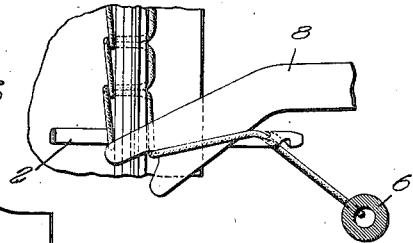
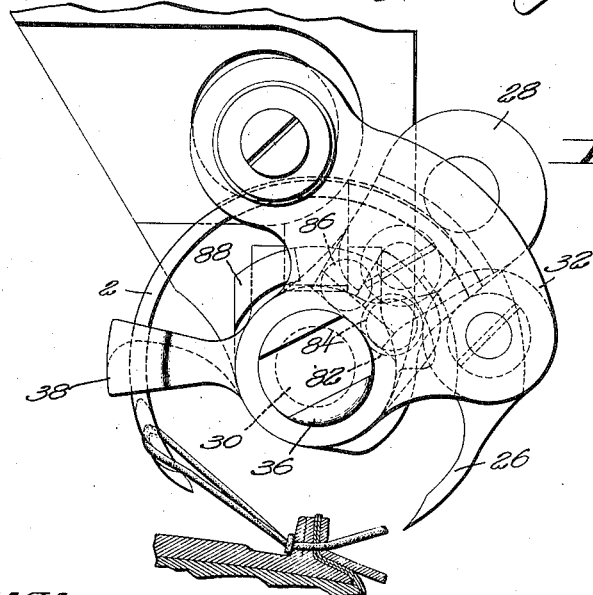

May 26, 1936.　　A. R. MORRILL　　2,041,945
SHOE SEWING MACHINE
Filed March 8, 1933　　15 Sheets-Sheet 9

May 26, 1936.  A. R. MORRILL  2,041,945
SHOE SEWING MACHINE
Filed March 8, 1933  15 Sheets-Sheet 10

Witness
Frederick S. Greenleaf

Inventor
Alfred R. Morrill
by Fish Hildreth
Cary & Jenney Attys.

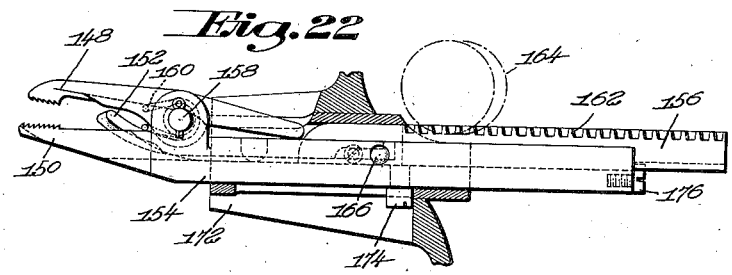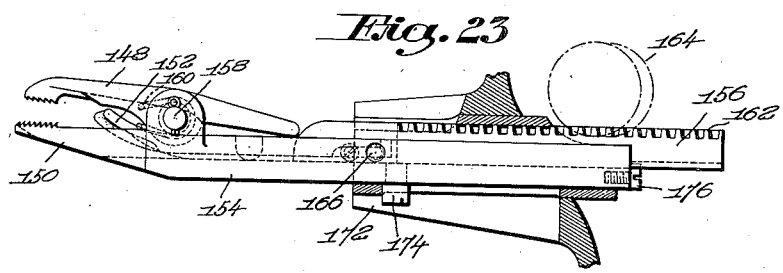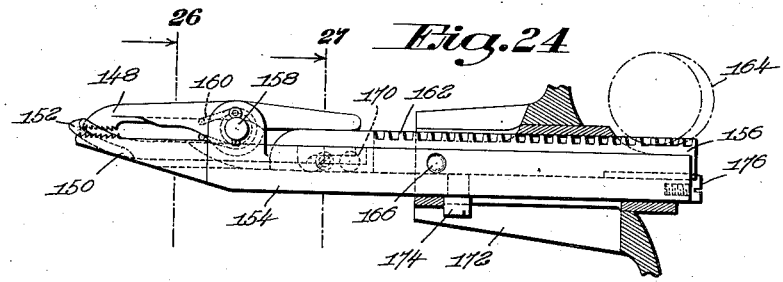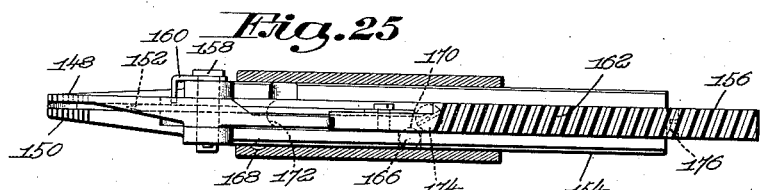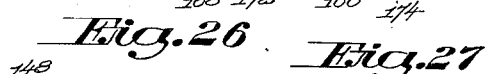

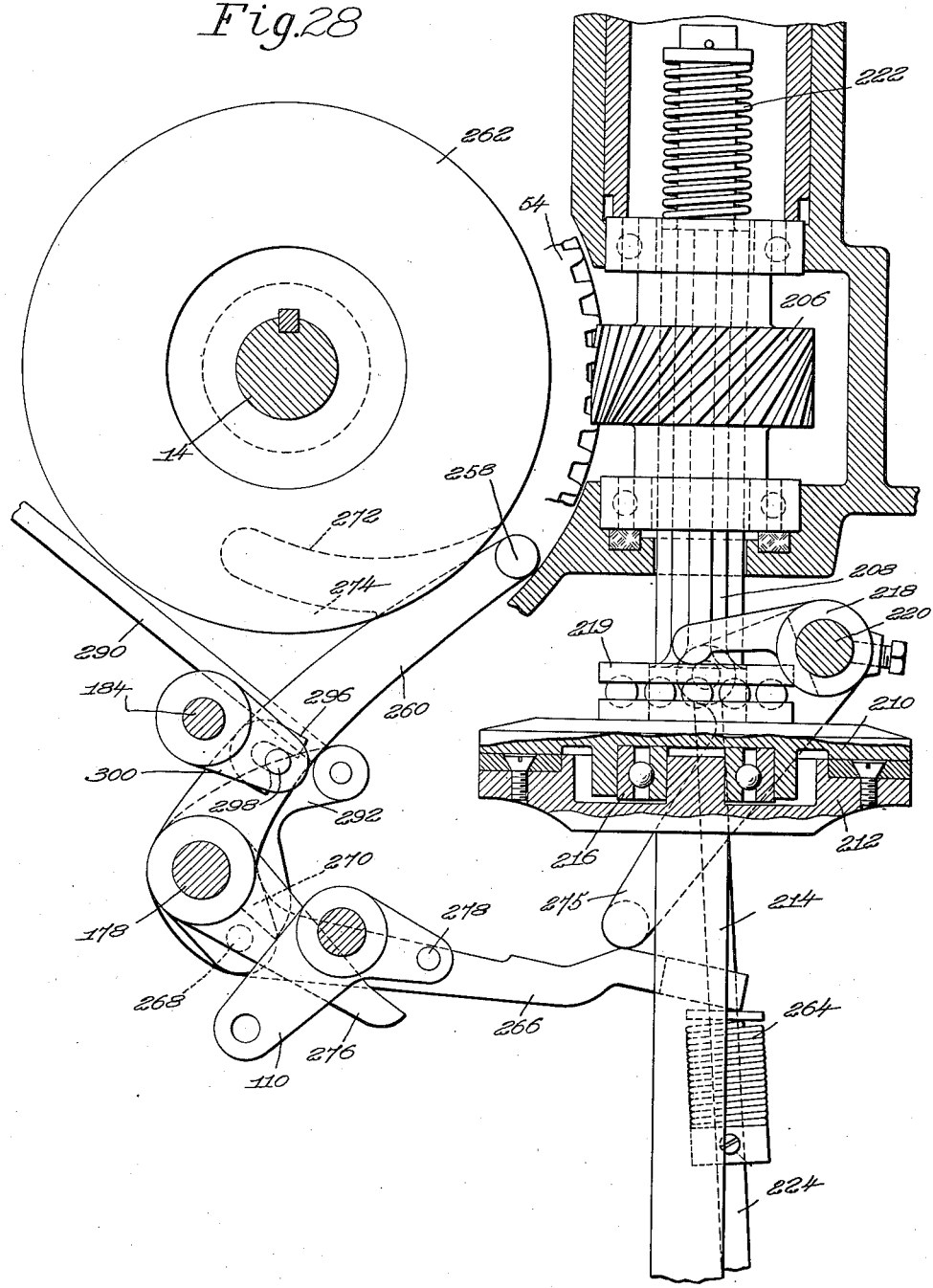

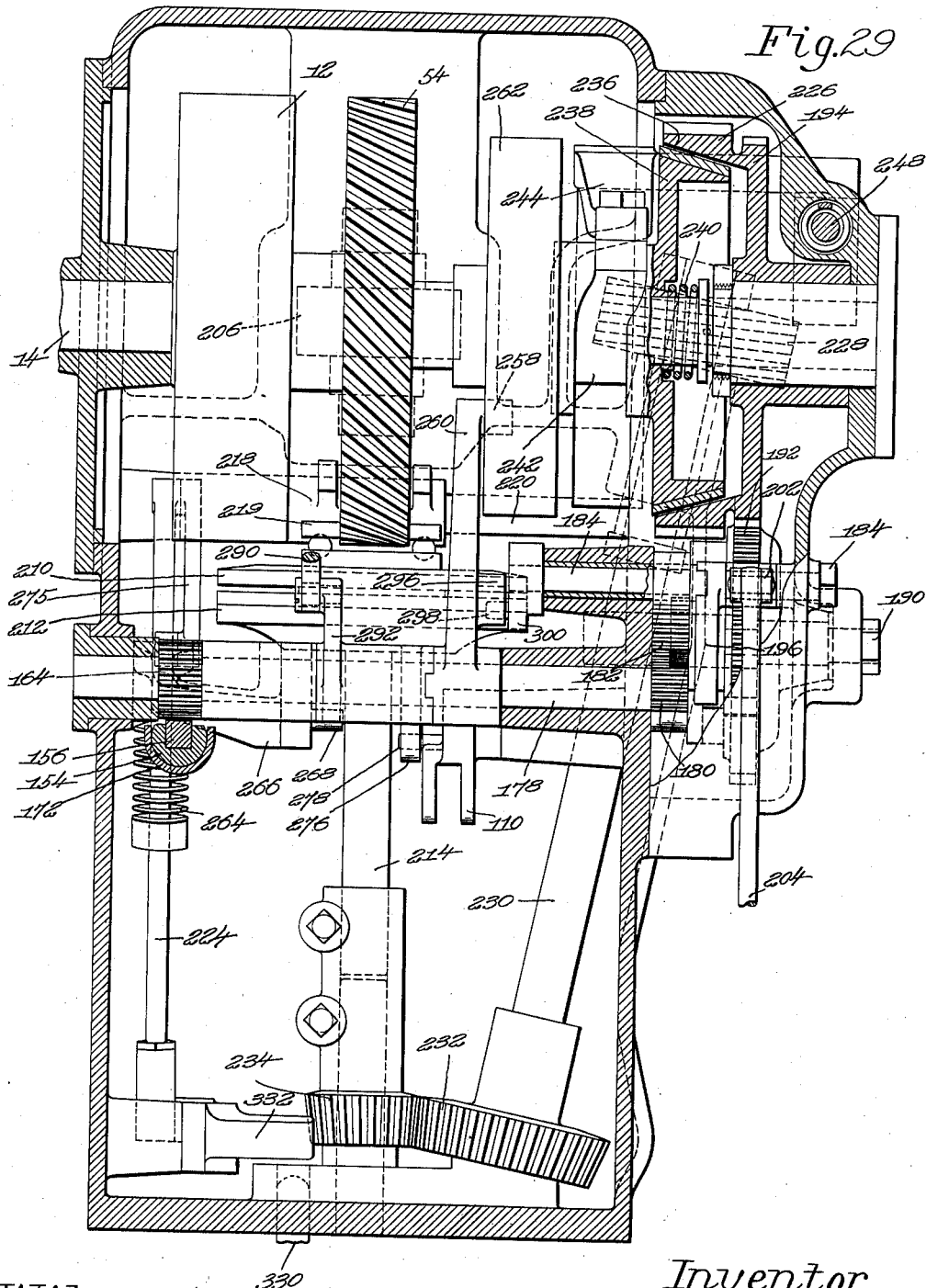

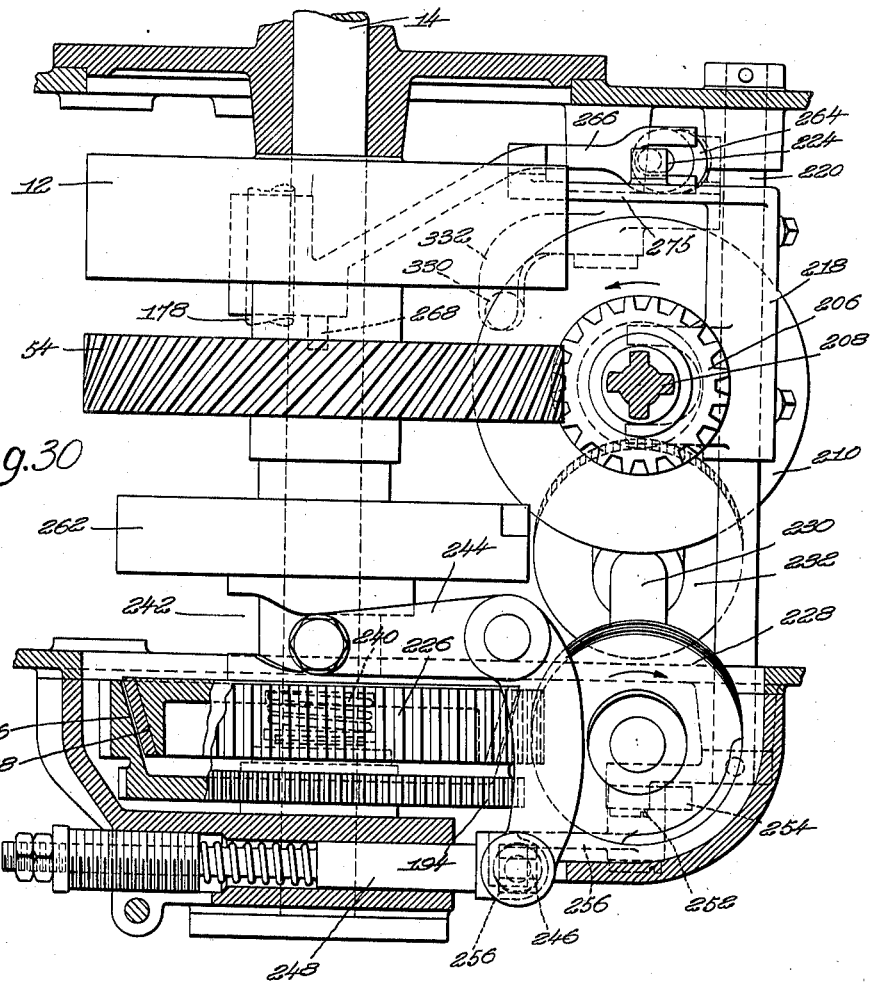

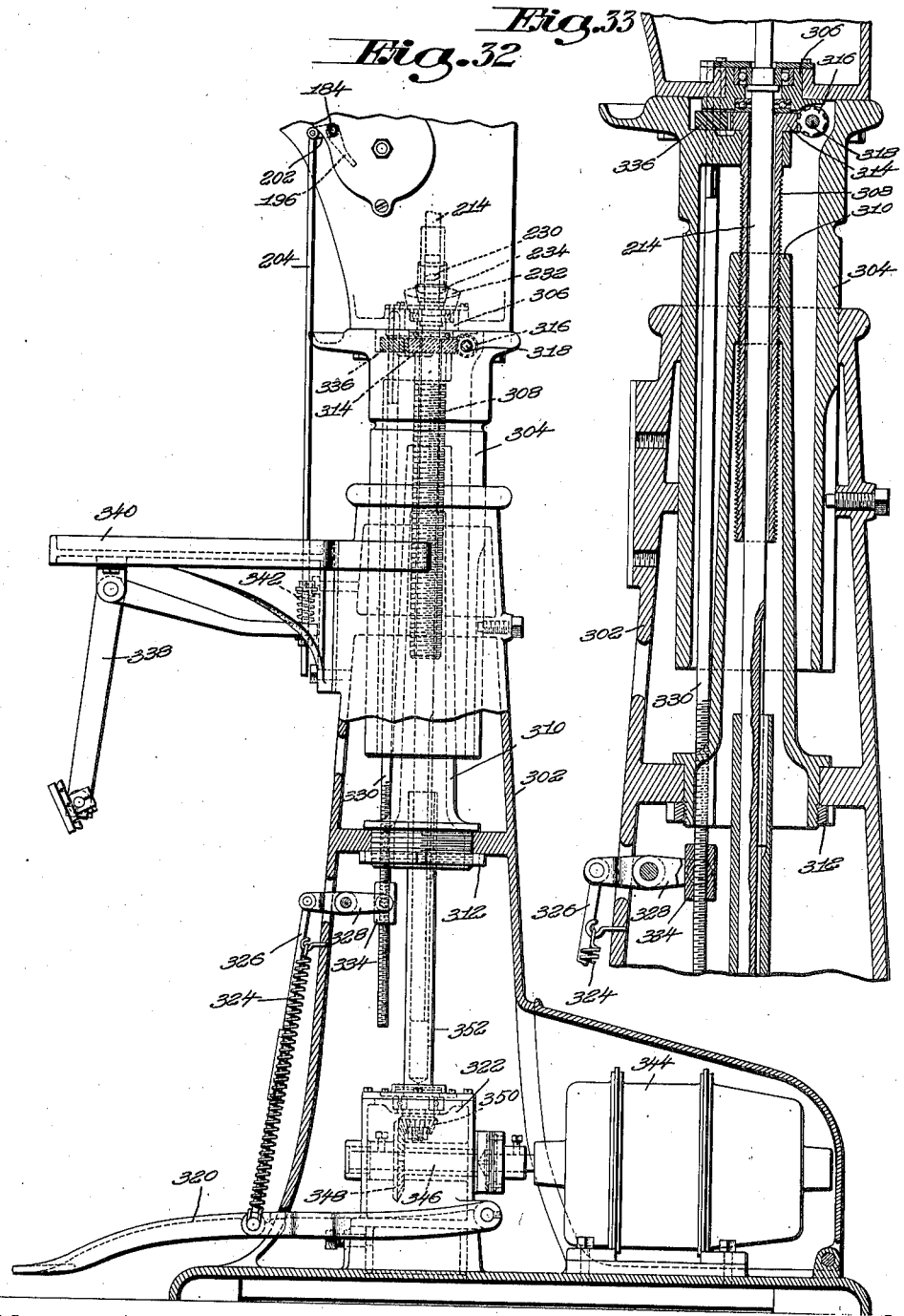

Patented May 26, 1936

2,041,945

UNITED STATES PATENT OFFICE 2,041,945

SHOE SEWING MACHINE

Alfred R. Morrill, Beverly, Mass., assignor to United Shoe Machinery Corporation, Paterson, N. J., a corporation of New Jersey Application March 8, 1933, Serial No. 660,018

37 Claims. (Cl. 112—35)

The present invention relates to inseam shoe sewing machines, and is herein shown as embodied in a curved hook needle chain stitch machine for sewing the upper and welt of a welt shoe to the insole.

Welt inseam shoe sewing machines as usually designed are provided with a needle arranged to enter the work from the welt side and, consequently, operate to lay the chain of the seam upon the welt. In machines having the needle arranged to enter the work from the welt side, it is well recognized that the stitches can be formed and tightened in the most uniform and satisfactory manner by the use of a take-up and a thread finger timed respectively to draw a loop of thread tight around the shank of the needle while the needle is in the work and thus exert a stitch setting strain on the seam, and to draw off thread between the looper and the work while the needle is through the work, in order to provide thread for the work side of the next loop during the retracting stroke of the needle and enable the needle to tighten the stitch without excessive reeving of the thread through the hook of the needle. The satisfactory results secured in these machines by the use of a thread finger and take-up operating as above described are due to the fact that the position of the work in the machine is determined by the channel guide and that consequently, the bottom of the channel in the insole into which the thread is drawn by the needle is always at a fixed distance from the hook of the needle when the needle reaches its point of greatest retraction, regardless of variations in the thickness of the materials being sewed. Hence, with stitches of equal length the same amount of thread is drawn by the needle to tighten the stitch, regardless of variations in the thickness of materials through which the needle passes and a take-up and a thread finger having a uniform and unvarying action in giving up thread to the needle can be used without causing reeving in the hook of the needle with consequent injury to and possible breakage of the thread.

For reasons well recognized by those skilled in the art, it is desirable to have the chain of an inseam laid in the channel of a welt shoe instead of upon the welt, and machines have been designed to do this. In such machines the needle necessarily enters the work from the channel side and during its retracting stroke draws back a loop of thread which, measured from the welt side of the work, varies with variations in the thickness of the materials through which the needle passes. On account of this variation in the amount of thread drawn through the work by the needle, there has been more or less reeving of the thread through the hook of the needle in machines heretofore designed to lay the chain in the channel, and the stitches of the seam have been formed less uniformly and in a less satisfactory manner than with those machines which operate to lay the chain on the welt.

An object of the present invention is to improve the operation of chain stitch inseam shoe sewing machines operating to lay the chain in the channel of the insole and with this object in view, the invention contemplates providing a machine of this type with a take-up and thread finger similar in some respects to the take-up and thread finger of prior machines operating to lay the chain on the welt, but arranged to operate in a different manner so as to supply the requisite amount of thread to the needle to prevent excessive reeving through the needle hook, and cooperate with the needle in forming uniformly tight stitches regardless of the thickness or variations in the thickness of the materials being sewn.

In sewing with a curved hook needle arranged to enter the work from the channel side, difficulty has been experienced in causing the needle to emerge always at the proper point on the upper and welt. The needle, in entering the work, should strike at the bottom of the channel and should emerge from the insole at the junction of the shoulder with the feather and, in a welt shoe, should emerge from the stitch receiving groove in the welt. An object of the invention is to render the operation of the needle in this respect uniform and certain, and with this object in view, a feature of the invention contemplates the provision of a curved awl entering the work from the outside, that is, the side opposite the channel constructed to overlap and support the point of the needle, together with means for relatively actuating the needle and awl so that the awl first perforates the work and then, during its retracting stroke and during the work piercing stroke of the needle, overlaps and protects the needle point so that the needle is guided accurately through the material in the path previously formed by the awl. Any deflection of the needle point is thus prevented and the needle is caused to emerge from the work at the point at which the awl entered, which point, of course, is uniform and can be determined with absolute certainty.

Also, to improve the operation of the needle of a chain stitch machine in which the needle is arranged to enter the channel side of the work, the needle of the machine hereinafter described as embodying the several features of the present invention is formed of smaller radius than needles that have heretofore been used, the radius of the needle being such that the needle can be arranged to strike at the bottom of the channel of a shoe and emerge in the welt groove while clearing the insole surface inside of the channel, so that the needle loop around the shank of the needle can be drawn tightly against the channel lip of the insole by the take-up which is used in the machine to set the stitch. It has been found that with the use of a needle of usual radius not only is difficulty experienced in causing the needle to strike at the base of the channel and emerge at the welt groove, but the shank of the needle lies in contact with or so close to the surface of the insole inside of the channel as to prevent the needle loop which is around the shank of the needle from being drawn down into the channel and against the channel lip of the insole.

In an inseam shoe sewing machine having the needle arranged to enter the work from the channel side, as heretofore constructed, the feed of the work has been intermittent and, consequently, has involved starting and stopping the work during each stitch forming cycle. To improve the operation of this type of inseam shoe sewing machine in this respect, a feature of the present invention contemplates combining with the needle arranged to enter the work from the channel side, an awl arranged to enter the work on the side opposite the channel, and a channel guide, together with mechanism for actuating these parts to impart a continuous feeding movement to the work. To secure this result, preferably the channel guide and awl are mounted upon separate feed carriers, and these carriers are so actuated that at least a portion of the back feed of the channel guide takes place while the awl is in the work, whereby the needle is relieved of the strain to which it would be subjected if the principal portion of the back feed of the channel guide took place while the work was being pressed hard against the channel guide by the retracting stroke of the needle. In the construction hereinafter specifically described, the needle is mounted on the same feed carrier as the awl so that it moves back and forth in the line of feed with the awl and the awl and needle remain always in the same plane with relation to each other, although a feeding movement continuous with relation to the machine is imparted to the work.

Other features of the present invention, certain of which are not limited to use in an inseam sewing machine in which the needle is arranged to enter the work from the channel side relate to improvements in mechanism for driving and stopping the machine and for performing certain operations in stopping, in mechanism for severing the welt after the sewing operation has been completed, in mechanism for threading the needle, in mechanism for controlling the operation of the back rest and welt guide, in mechanism for actuating the needle guide, and in certain constructions, arrangements and combinations of parts hereinafter described and claimed, the advantages of which will be apparent to those skilled in the art from the following description taken in connection with the accompanying drawings illustrating a welt shoe sewing machine embodying the several features of the invention.

Figure 2:
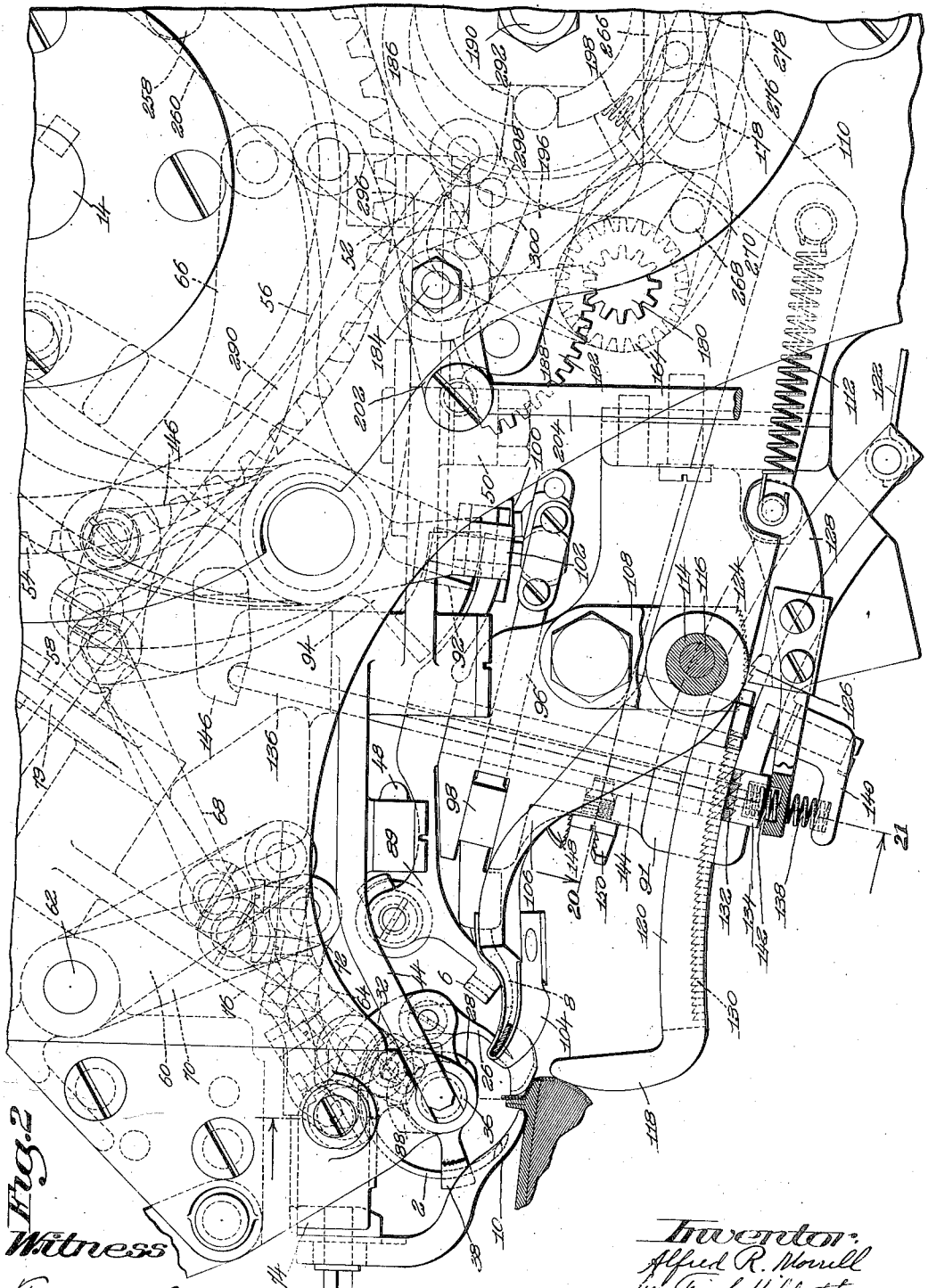
Figure 3:
Figure 4:
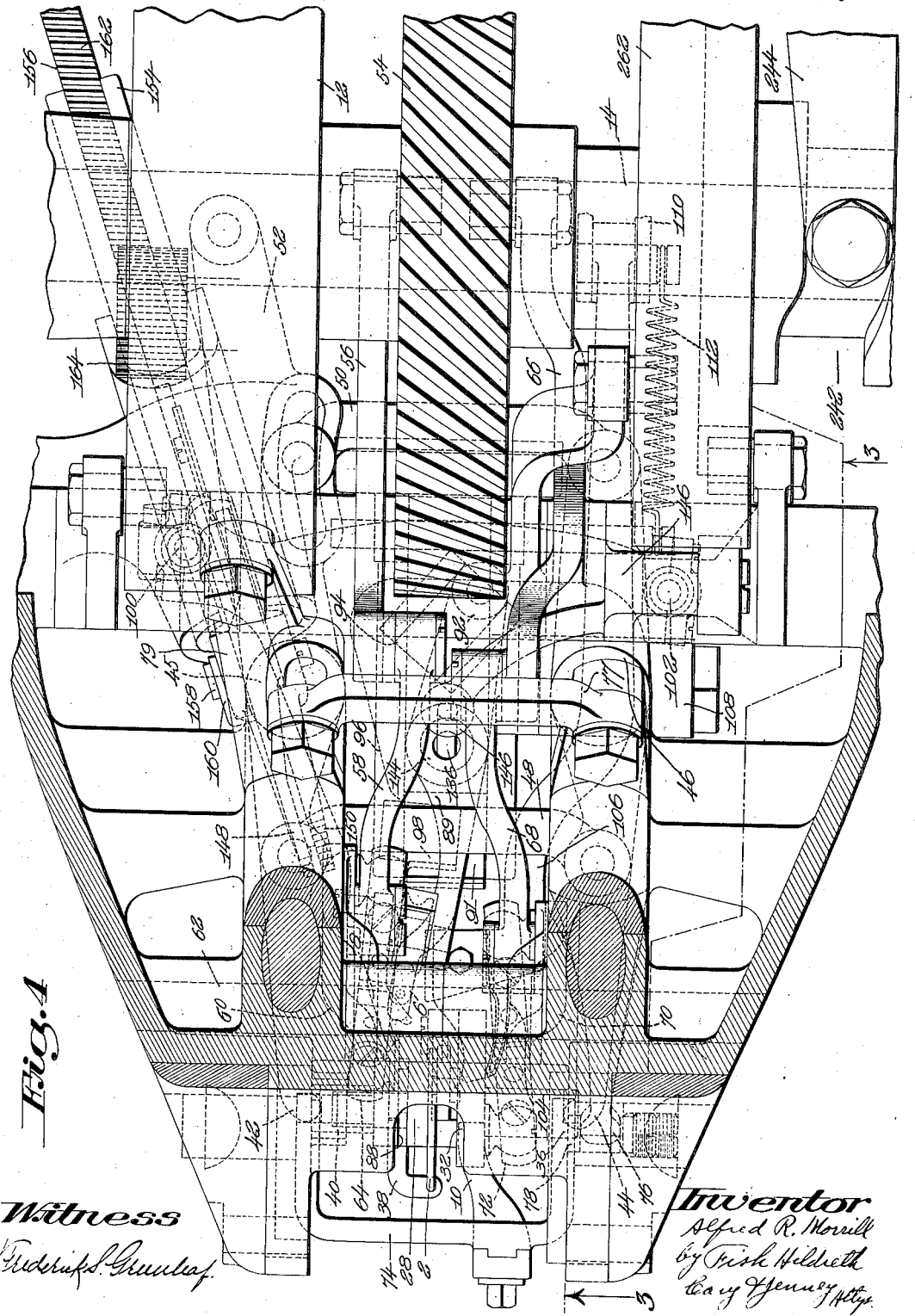
Figure 18:
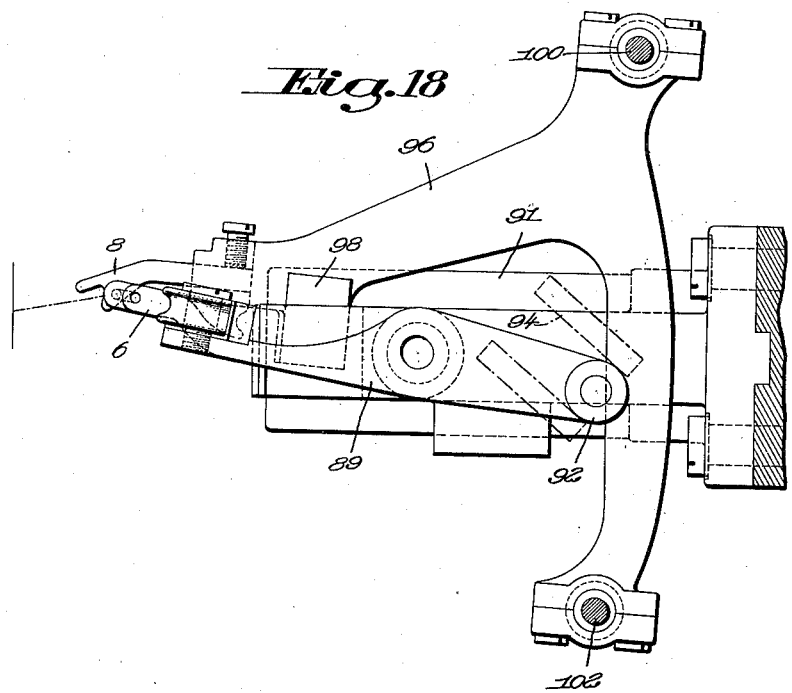
Figure 19:
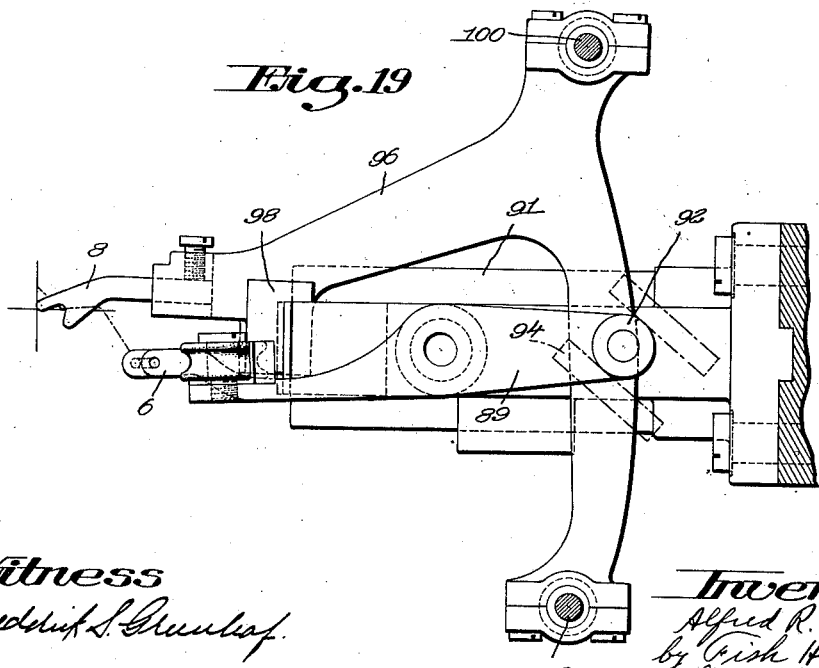
Figure 20:
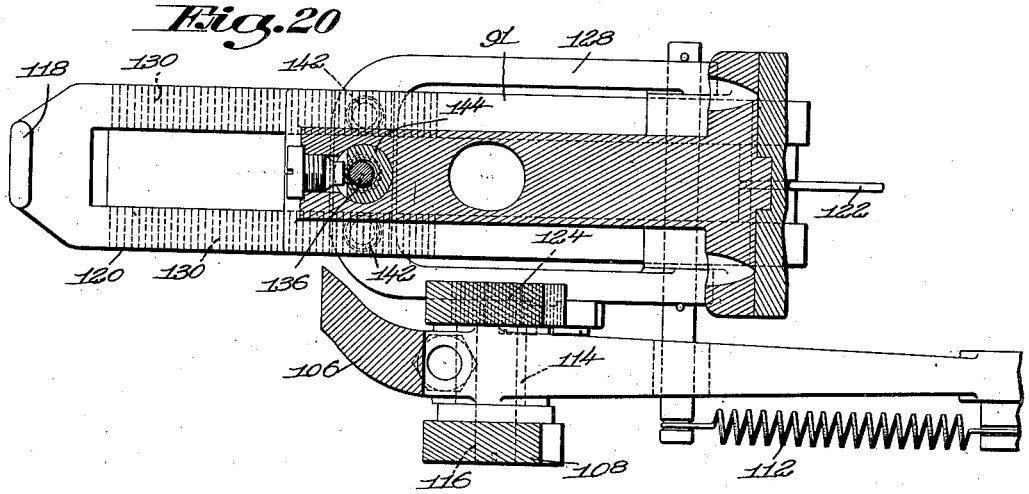
Figure 21:
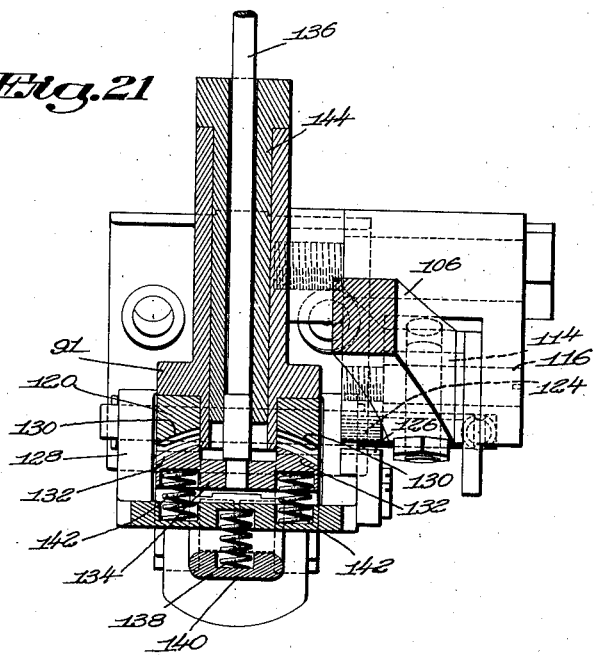

Referring to the drawings Fig. 1 is a view in side elevation of the head of the machine; Fig. 2 is a view in side elevation on an enlarged scale showing a portion of the machine illustrated in Fig. 1; Fig. 3 is a view similar to Fig. 2, with a portion of the machine frame broken away and parts shown in section on the plane indicated by the line 3—3 of Fig. 4; Fig. 4 is a sectional plan view on a plane indicated by the line 4 in Fig. 3; Fig. 5 is a detail front view illustrating particularly the welt guide, back rest, thread arm and looper mechanisms; Fig. 6 is a detail plan view illustrating particularly the needle, awl and channel guide mechanisms; Fig. 7 is a vertical sectional view of the parts illustrated in Fig. 6, taken on a plane passing through the axis of the needle and awl slide; Fig. 8 is a detail sectional view taken on the line 8—8 of Fig. 7, looking in the direction of the arrow 8; Fig. 9 is a detail sectional view on the line 8—8 looking in the direction of the arrow 9; Fig. 10 is a detail sectional view similar to Fig. 8, but with the parts in a different position; Fig. 11 is a detail view in side elevation illustrating the operation of the needle, awl, thread arm and looper mechanisms; Fig. 12 is a detail sectional plan view illustrating the needle, thread arm and looper in the same positions as in Fig. 11; Fig. 13 is a view similar to Fig. 11 with the parts in the positions they assume after the awl has pierced the material and the needle has been advanced into overlapping relation with the awl; Fig. 14 is a detail cross sectional view of the needle and awl taken on the plane indicated by the line 14 of Fig. 13; Fig. 15 is a view similar to Fig. 11 with the parts in the position they assume after the needle has pierced the work and the thread arm and looper have operated to draw out a bight of thread and thread the needle; Fig. 16 is a detail sectional plan view showing the needle, thread finger and looper in the same positions as in Fig. 15; Fig. 17 is a detail view similar to Fig. 11 showing the needle and awl in the positions assumed when the needle is at the limit of its backward stroke; Fig. 18 is a detail sectional plan view of the thread finger and looper mechanisms; Fig. 19 is a view similar to Fig. 18 but with the parts in a different position; Fig. 20 is a detail sectional plan view of the welt guide and work rest mechanisms taken on the plane indicated by the line 20 on Fig. 2; Fig. 21 is a detail sectional view of the welt guide and back rest mechanisms taken on the plane indicated by the line 21 on Fig. 2; Fig. 22 is a detail view in side elevation of the welt gripping and cutting mechanism; Figs. 23 and 24 are views similar to Fig. 22, but with the parts in different positions; Fig. 25 is a detail plan view of the parts illustrated in Fig. 22; Fig. 26 is a detail sectional view taken on the plane indicated by the line 26 in Fig. 24; Fig. 27 is a detail sectional view taken on the plane indicated by the line 27 in Fig. 24; Fig. 28 is a detail vertical sectional view illustrating in side elevation a portion of the driving and stopping mechanism; Fig. 29 is a vertical sectional view of the head of the machine looping from the front, illustrating particularly the driving and stopping mechanism; Fig. 30 is a detail sectional plan view with many of the parts omitted illustrating particularly the driving and stopping mechanism; Fig. 31 is a detail view of devices associated with the thread tension mechanism; Fig. 32 is a view in side elevation, partly in section, of the base or column upon which the head of the machine is mounted, and Fig. 33 is a vertical sectional view of the upper portion of the column.

The curved hook needle of the machine is indicated at 2 and is arranged to enter the work from the channel side. Cooperating with the needle 2 in forming the stitches is a take-up indicated at 4, Fig. 1, which, when the needle is through the work, as indicated in Fig. 15, is actuated to draw the needle loop, through which the needle is passed during its forward movement, tight around the shank of the needle and exert a stitch setting strain on the same. Also cooperating with the curved hook needle is a needle threading looper 6 provided with a thread eye through which the thread passes and a thread finger 8 arranged to engage the thread between the work and the looper and draw out a bight of thread, as indicated in Figs. 15 and 16 while the needle is through the work. The needle hook engages the thread between the thread finger and the looper, and during the retracting stroke of the needle the bight of thread between the hook of the needle and the work is given up to the needle by the thread finger and thus the needle is permitted to draw a loop of thread through the work without causing the thread to reeve through the needle hook.

The position of the work in the machine is determined by a channel guide indicated at 10 and consequently the length of loop drawn back by the needle measured from the welt side of the work varies with variations in the thickness of the materials being sewed. In order to avoid excessive reeving of the thread through the hook of the needle upon an increase in the thickness of the materials being sewed, or when sewing thick materials, the thread finger of the illustrated machine is arranged to move in such a path with relation to the work that the length of the bight of thread drawn out by the thread finger is not decreased with an increase in the thickness of the work but remains substantially constant for all thicknesses of work. Substantially the same amount of thread is, therefore, always given up by the thread finger to the needle after the needle hook enters the work during its retracting stroke, and inasmuch as the needle hook reaches the surface of the work sooner with thick work than with thin work, the total amount of thread given up to the needle by the thread arm and take-up after the needle hook enters the work varies with the thickness of the work and little, if any, reeving of the thread through the hook of the needle under an injurious strain takes place as the needle reaches the limit of its backward stroke, regardless of variations in the thickness of the material being sewed. In the machine illustrated, the movement of the thread finger is radially inward and towards and slightly across the plane of the needle, as indicated in Figs. 15 and 16. This movement of the thread finger causes the length of thread extending from the last needle hole to the thread finger to remain substantially the same whether the work increases or decreases in thickness. From Fig. 15 it will also be seen that an increase in the thickness of the work will bring the surface of the welt nearer to the hook of the needle and consequently will cause a given movement of the take-up to give up to the needle after the needle hook enters the work an amount of thread varying with the variations in the thickness of the work. With this method of sewing, it will be noted that the increase in the amount of thread given up to the needle after the needle hook enters the work is one-half of the increase in the total amount of thread in the needle loop measured from the welt side of the work to the needle hook. Theoretically this should cause a slight reeving of the thread in the hook of the needle upon an increase in work thickness. In actual practice, however, an increase in work thickness is usually accompanied by a greater separation of the layers of the work or a change in their character so that they are more readily compressed and thus the needle is enabled to tighten the stitches properly without any appreciable or injurious thread reeving action.

In the illustrated machine the takeup lever 4 is actuated by a cam groove in a cam disk 12 on the cam shaft 14 of the machine. This cam groove engages a cam follower on the rear end of the take-up lever and is shaped as illustrated in Fig. 1, to actuate the take-up lever positively to draw the thread tight around the shank of the needle, as shown in Fig. 15, and then draw from the supply through the tension wheel 16, the amount of thread used in forming the preceding stitch, which amount varies with variations in the thickness of the material. The take-up lever is acted upon by a spring 18 (see Figs. 1 and 31) coiled around the pivot shaft 20 to which the take-up lever is fixed, one end of which spring is connected to the take-up lever, and the other end of which spring is connected to an arm 22 pivotally mounted upon the shaft 20 and engaged by an adjusting screw 24. The tendency of the spring 18 is to urge the outer end of the lever upwardly to exert a yielding tension on the thread between the tension wheel and the work, and the cam groove, which engages the follower at the rear end of the take-up lever, is shaped to permit this action of the spring after the take-up has been actuated positively to exert a stitch setting strain on the seam and draw thread from the supply. The take-up is thus supported yieldingly during the action of the thread arm in drawing out its bight of thread, during the action of the looper, and during the retracting stroke of the needle, and can give up the required varying amount of thread while offering sufficient resistance to the needle pull to insure proper tightening of the stitches.

In inseam shoe sewing machines in which the needle is arranged to enter the channel side of the work, the needle, in order to strike at the bottom of the channel and emerge at the proper point on the upper or welt must pass close to the surface of the sole inside of the channel lip. The needles ordinarily used in commercial inseam sewing machines have a radius of $\frac{11}{16}$ of an inch. When it is attempted to use a needle of this radius in a machine provided with a stitch setting take-up operating while the needle is in the work and with a needle entering the channel side of the work, a loose seam often results by reason of the fact that the loop of needle thread is pinched between the shank of the needle and the surface of the sole and is not drawn down tightly into the channel and against the channel lip. To avoid this result, the illustrated machine is provided with a needle of small radius as, for instance, a radius of $\frac{1}{16}$ of an inch. When a needle of this small radius is used, it has been found that the work can readily be manipulated to cause the needle to strike at the bottom of the channel and emerge in the groove of the welt or at the desired point on the upper and, at the same time, leave sufficient clearance between the shank of the needle and the surface of the insole to permit the needle loop around the needle shank to be drawn tightly against the channel lip.

A curved awl indicated at 26 is arranged to enter the work on the welt side or on the side opposite the channel. This awl is mounted concentrically with the needle and is arranged to pass completely through the work and emerge in the channel, as indicated in Fig. 13. After the awl has perforated the work, the needle is advanced to meet the awl and follows the awl through the work during the retracting movement of the awl. The needle thus passes through the perforation made by the awl and emerges from the work at the point where the awl entered. To avoid any possibility of a deflection of the needle during its passage through the work, the needle and awl are provided at their points with corresponding surfaces which, when the awl is through the work are brought into overlapping relation as indicated in Figs. 13 and 14, so that in effect, the needle and awl form a continuous instrument during the advancing stroke of the needle through the work.

The needle is clamped to an arm or segment 28 projecting from a hub 30 forming part of a slide mounted to move back and forth in the direction of feed, as best shown in Figs. 6 and 7. The awl is clamped to an arm or segment 32 projecting from a hub 34 which is mounted to turn on a cylindrical portion of the hub 30 at one side of the needle segment, and is held from endwise movement with relation thereto by an end block 36. The needle and awl are thus mounted to move together back and forth in the direction of feed and to remain permanently in the same plane with relation to each other. At the opposite side of the needle segment 28 from the awl a needle guide 38 is mounted to turn on a cylindrical portion of the hub 30 and is held from endwise movement thereon by an end block 40. The end blocks 36 and 40 are mounted in guideways in the frame of the machine, the cylindrical portions of the hub 30 are mounted to turn in the end blocks, and the hub 34 of the awl segment is mounted to turn on the hub 30 and also in a bearing on the machine frame. End blocks 36 and 40, the hub 30 and the parts mounted thereon thus constitute a slide carrying the needle and awl which is movable back and forth in the direction of feed and which can be actuated to feed or assist in feeding the work. Back and forth movements are imparted to this slide by means of levers 42 and 44 pivotally mounted respectively on short stub shafts 44 and 46 and engaging at their forward ends with slots formed in the end blocks 40 and 36. The levers are connected together by a link 48 and the lever 44 is provided with a rearward extension pivotally connected to a link 50. The other end of the link 50 is adjustably connected by a block and curved slot to a cam actuated arm 52 pivotally mounted on the stub shaft 44.

Oscillating work piercing and retracting movements are imparted to the needle from a cam groove formed in one face of a spiral gear 54 secured to the cam shaft 14 through a series of levers and links comprising the cam actuated lever 56, a link 58, a swinging arm 60 pivoted at 62 on the machine frame and connected by the link 58 to the lever 56 and a link 64 extending between the lower end of the arm 60 and the needle segment 28 and having a ball and socket connection with each of these parts. Oscillating work piercing and retracting movements are imparted to the awl from a cam groove in the opposite face of the gear 54 through a series of levers and links similar to those for actuating the needle. These levers and links comprise the cam actuated lever 66, the link 68, the pivotally mounted arm 70 and the connecting link 72.

In the illustrated machine the slide carrying the needle and awl is moved in a direction to feed the work while either the needle or the awl is in the work and is moved in the opposite direction or back-fed while both the needle and awl are out of the work. To avoid the objectionable features of an intermittent feed of the work involving starting and stopping the work during each stitch forming cycle, means are provided for continuing the feed of the work while the needle and awl are out of the work, thus producing a continuous and preferably uniform feed of the work through the machine. To this end the channel guide 10 is mounted upon a separate slide to reciprocate back and forth in the direction of feed. This slide comprises a yoke shaped frame 74 (see Figs. 4, 6 and 7) formed with projecting bearing sleeves or blocks mounted to slide in the machine frame.

The channel guide 10 is secured to the slide 74 so as to be adjustable vertically and is moved back and forth in the line of feed with the slide while remaining in engagement with the bottom of the channel of the shoe sole. Reciprocating movements are imparted to the slide 74 through cam actuated connections comprising a lever 76, the forward end of which engages a slot in one of the end blocks of the slide 74, as best shown in Fig. 7, and is confined between fixed and adjustable bearing blocks 78 and 80 mounted in the slide. The rear end of the lever 76 is connected to one end of a link 77, the other end of which has an adjustable block and slot connection with a cam actuated lever 79.

The back and forth movements of the slide 74 are timed with relation to the back and forth movements of the slide carrying the needle and awl so as to produce a continuous and preferably uniform feeding movement of the work. In order to relieve the needle of the strain to which it would be otherwise subjected by the drag on the channel guide over the work, at least a portion of the back feeding movement of the channel guide is preferably timed to take place while the awl is in the work.

The needle guide (see Figs. 6, 7, 8, 9 and 10) is positively moved towards and from the work through connections with the needle segment comprising a ball 82 mounted in a perforation extending parallel with the axis of the needle movement through the hub of the needle guide and arranged to engage alternately locking recesses 84 and 86 formed respectively in the adjacent faces of the needle segment and the end block 40. The forward movement of the needle guide is limited by a projection 88 on the end block 40, which block is held from rotation by means of a tongue 43 projecting from the block into a guideway 90 in the frame of the machine. When the needle guide is in this position the recess in the hub of the guide is opposite the recess in the block 40 so that the ball 82 can pass into the recess in the block 40 while the needle segment continues its forward movement. The needle guide remains locked in position by the ball during the retracting stroke of the needle segment until the recess in the needle segment comes opposite the perforation in the hub of the needle guide. At this time a lug on the needle segment engages the needle guide, and during the continued backward movement of the needle segment, the needle guide is also moved backwardly, the ball 82 moving from the recess in the block 40 to the recess in the needle segment and locking the guide to the needle segment during the continued backward movement of the needle segment, and during the first portion of its forward movement.

As has been described, the thread finger in drawing out a bight of thread between the looper and the work moves radially inward towards the center of the needle circle and across the plane of the needle. In cooperating with the thread finger to thread the needle, the looper 6 moves across the plane of the needle outside of the circle of the needle, as indicated in Fig. 16. The thread is thus laid directly into the needle hook without the necessity of moving the looper in a circle about the needle, a comparatively simple mechanism can be utilized for actuating both the looper and the thread finger and the parts can be arranged so as to operate efficiently and with certainty without interference on the part of the awl.

The looper eye through which the thread passes is formed on the forward end of the looper lever 89 which is pivotally mounted midway its length on the upper end of a bracket 91 forming a portion of the machine frame, and is provided at its rear end with a roll 92 engaged by a cam slot formed in the end of the downwardly extending arm of a cam actuated bell crank lever 94. The cam slot is inclined to the path of movement of the lower end of the lever 94 and as the lever is oscillated, the looper lever is given a simple swinging movement to carry the eye of the looper back and forth across the plane of the needle.

In order to give the thread finger its radial and lateral movements with relation to the needle, it is secured at the forward corner of a three-cornered support or plate 96. The support 96 is mounted to slide forwardly and backwardly and laterally on the bracket 91 by means of a guiding portion 98 near its forward corner engaging a horizontal guiding slot in the bracket. At its two rear corners the support 96 is mounted by means of universal joints upon the lower ends of two cam actuated levers 100 and 102, which levers sustain the rear portion of the support 96 and by their relative movement, impart the desired forward and back and lateral movements to the thread finger.

The welt guide is indicated at 104 and consists of a loop through which the welt passes secured to the forward end of a welt guide carrier 106 in the form of a bar extending downwardly and then rearwardly from the welt guide and supported upon depending pivotaly mounted slotted links 110 and 108. The welt guide is held yieldingly pressed against the shoe during the sewing operation by means of a spring 112 stretched between a point on the machine frame and the lower end of the link 110. The arrangement of the links 108 and 110 is such that as the welt guide moves towards and from the shoe, a portion of the welt guide in proximity to the shoe moves in a path coincident with that of the needle. In order to adjust the welt guide so as to bring the groove in the welt being operated upon into the path of the needle, the pivotal connection between the front link 108 and the welt guide carrier 106 consists of an eccentric sleeve 114 which is adjustably mounted on the supporting pin 116.

In addition to the welt guide, the work is supported and guided in the machine by means of a work rest indicated at 118 arranged to bear against the last supported upper beneath the welt guide. The work rest 118 is formed at the forward end of a curved slide 120 which extends rearwardly and downwardly from the work rest and is mounted in a curved guideway in the lower portion of the bracket 91 of the machine frame. The work rest is held yieldingly in contact with the shoe during the sewing operation by means of a spring 122 mounted on the frame of the machine and bearing against the rear end of the slide 120.

It is desirable to hold the welt guide and also preferably the work rest rigidly against backward movement during the work piercing stroke of the needle and also during the action of the take-up in setting the stitch. Accordingly the illustrated machine is provided with means for locking the welt guide and work rest carriers at these points in the stitch forming cycle and to leave the welt guide and work rest yieldingly engaged with the work at other times during the stitch forming cycle so as not to interfere with the feeding of the work. The means for locking the welt guide carrier comprises ratchet teeth 124 at the lower end of the forward supporting link 108 and a multiple toothed pawl 126 secured to a pawl carrying lever 128. The means for locking the work rest slide comprises ratchet teeth 130 upon the lower surface of the slide at opposite sides of a slot extending lengthwise of the slide and cooperating multiple toothed pawls 132 formed on a pawl carrying block 134 secured to the lower end of a vertically arranged rod 136 (see Figs. 2, 20 and 21). The pawl carrying lever 128 extends beneath the pawl carrying block 134 and a spring lever 138 interposed between the forward end of the lever 128 and a fixed bracket 140 extending beneath the lever tends to force the lever upwardly and bring the pawl 126 and 130 into engagement with their corresponding ratchets. To insure the firm engagement of the pawls with both sets of ratchet teeth 124 and 130, springs 142 are interposed between the pawl carrying lever 128 and the pawl carrying block 134. The rod 136 to the lower end of which the pawl carrying block 134 is secured extends upwardly through a sleeve 144 which is mounted in the bracket 91 of the machine frame and which forms the hub of the looper lever 89. At its upper end the rod 136 is engaged by a cam actuated lever 146 (see Fig. 5) the action of which lever is to depress the rod 136 and move the pawl carrying block 134 and lever 128 downwardly to unlock the welt guide and work rest carriers. This unlocking operation takes place twice during each stitch forming cycle, once just after the needle has advanced through the work and again just after the take-up has acted to set the stitch. The longitudinal slot in the work rest slide permits the rod 136 to pass through the slide without interfering with its movement and the slot also serves as a guide which is engaged by a guiding projection from the bracket 91, as best shown in Figs. 20 and 21.

Mechanism for severing the welt after the sewing operation has been completed (see Figs. 22 to 27 inclusive) comprises welt gripping jaws 148 and 150 and a welt severing knife 152. The welt gripping jaws 148 and 150 are carried by a reciprocating slide 154 and the welt severing knife 152 is secured to a separate slide 156 mounted in the guide 154. The lower gripping jaw 150 is formed integrally with the slide 154 while the jaw 148 is in the form of a lever pivotally mounted at 158 on the slide 154 and acted upon by a spring 160 coiled around the pivot of the lever and arranged so that its tendency is to move the jaw 148 to its open position. The rear end of the movable gripper lever extends into the path of a shoulder on the slide 156 so that a forward movement of the slide 156 with relation to the slide 154 moves the gripper lever to its closed position. The slide 156 is provided with rack teeth 162 which are engaged by a pinion 164 by means of which the slide 166 is reciprocated, and locking connections are provided between the slide 156 and the slide 154, whereby during the first portion of the advancing movement of the slide 156 both slides move together until the gripping jaws have reached the position in which the welt is between them. The locking device then releases the slide and the continued forward movement of the slide 156 closes the grippers upon the welt and then causes the cutter 152 to sever the welt. During the first portion of the return movement of the slide 156, the slide 154 remains in its advanced position until the gripping jaws release the welt and then the two slides are again locked together and the slide 154, with the gripping jaws are retracted during the continued retracting movement of the slide 156. The locking device for connecting the slides 154 and 156 comprises a ball 166 mounted in a perforation in one of the walls of the slide 154 which is adapted to engage alternately locking recesses 168 and 170 formed respectively in the stationary guideway 172 in which the slide 154 reciprocates and in the slide 156. With the parts in retracted position, as illustrated in Figs. 22 and 25, the ball 166 is in engagement with the recess 170 and the slides 154 and 156 are locked together. When the slides reach the position indicated in Fig. 23, in which the welt lies between the gripping jaws, the ball 166 is opposite the recess 168 in the guideway and, at the same time, the forward movement of the slide 154 is stopped by the engagement of a downwardly projecting pin 174 on the slide 154 with the forward end of a slot in the guideway 172. Continued forward movement of the slide 156 forces the ball 166 into locking engagement with the recess 168 and locks the slide 154 to the guideway 172. During the retracting movement of the slide 156, the slide 154 remains locked to the guideway 172 until the parts again reach the position indicated in Fig. 23. At this time a shoulder on the slide 156 engages the head of a screw 176 in the rear end of the slide 154 and, during the continued retracting movement of the slide 156, the slide 154 is carried backwardly with the slide 156 and the two slides are locked together by the ball 166.

The welt gripping jaws approach the shoe at an angle to the direction of feed and grasp the welt between the end of the seam and the needle. By reason of the fact that the chain of the seam is laid in the channel, the thread leading from the last stitch to the looper extends across the welt and across the path of the gripping jaws. As a consequence when the jaws close upon the welt, the thread is included between the jaws. It is undesirable to have the thread severed at this time since a sufficient length of thread will not be left projecting from the looper with which to start the seam on the next shoe conveniently. Accordingly, in order to prevent the welt severing knife from cutting the thread, the upper gripper lever 148 is recessed, as indicated in Figs. 22, 23 and 24, and the knife 152 is shaped and arranged so as to pass beneath the thread when in this recess without cutting the thread.

The mechanism for actuating the welt gripping and cutting slides comprises a shaft 178 to the left hand end of which (see Fig. 29) the pinion 164 is secured. The other end of the shaft 178 is provided with a pinion 180 meshing with a gear segment 182 pivotally mounted on a shaft 184. The segment 182 is adapted to be oscillated by an eccentric 186, the pitman or strap 188 of which is pivotally connected to the segment. The eccentric is fixed to a shaft 190 which, when connected to a gear 192, is adapted to be rotated thereby. The gear 192 is mounted to rotate loosely on the shaft 190 and meshes with a gear 194 mounted to rotate on the cam shaft 14 and continuously driven as hereinafter described. For connecting the gear 192 to the shaft 190 to rotate the eccentric through the connections above described to actuate the welt cutting and gripping slides, a Horton clutch is provided, the operation of which is controlled by a stop arm 196 normally held in the path of a latch 198 carried by a driven part of the clutch. The stop arm is fixed to a shaft 184 rocking of which swings the stop arm away from the latch, thereby releasing the clutch and causing the eccentric to be rotated. While the machine is in operation sewing a seam, the shaft 184 is locked against movement by means hereinafter described. On stopping the machine, however, the shaft is unlocked and may be rocked by the operator from a knee lever, hereinafter described, through connections comprising an arm 202 secured to the shaft and a connecting rod 204.

Whenever the eccentric 186 is thrown into operation it makes a complete revolution and, consequently the welt severing devices, after being advanced to grasp and sever the welt are immediately retracted to their inoperative position. This mode of operation is permitted by reason of the fact that upon starting the seam on a new shoe the feeding devices which act on the shoe, engage the welt and feed the welt with the shoe so that the welt does not become displaced by movements of the shoe not imparted to the welt, and the use of welt gripping devices to hold the welt during the formation of the first few stitches is rendered unnecessary.

The driving mechanism of the machine comprises a gear 206 (see Figs. 1, 28, 29 and 30) meshing with the gear 54 on the main cam shaft, which gear 206 is mounted in bearings in the machine frame and is splined upon a vertical shaft 208. The shaft 208 is vertically movable and at its lower end is provided with the driven part 210 of the main friction driving clutch. The driving part of the main driving clutch is indicated at 212 and is carried upon the upper end of a vertical shaft 214 which is driven from a motor in the base of the machine, as will be hereinafter described. The driven part of the clutch is held in alignment with the driving part by means of a radial bearing 216 disposed between extending portions of the clutch and relative movement of the clutch parts to control the rotation of the vertical driven shaft 208 is effected by a forked member 218 secured to a pivot shaft 220. The arms of the forked member bear against a thrust bearing plate 219 surrounding the lower end of the vertical shaft 208. A spring 222 interposed between a collar on the upper end of the shaft 208 and the upper bearing for the gear 206 tends to raise the shaft and separate the members of the driving clutch. The forked clutch controlling member 218 is connected by means comprising a connecting rod 224 to a foot treadle by means of which the clutch can be actuated to cause the cam shaft of the machine to be rotated at the desired speed.

The stopping mechanism for the machine comprises a comparatively low speed driving mechanism which operates after the main driving clutch has been thrown out to slow down the driving shaft and then rotate it in a reverse direction to final stopping position. This low speed driving mechanism comprises a gear 226 integral with the gear 194 mounted to rotate loosely on the cam shaft 14 and meshing with a gear 228 upon the upper end of an inclined vertical shaft 230 to the lower end of which is secured a bevel gear 232 meshing with a bevel gear 234 on the motor driven shaft 214. The gear 226 is provided with an inner clutching surface 236 forming the driving member of a friction clutch, the driven member of which is indicated at 238, and is splined for sliding movement upon the cam shaft 14. Normally the driven clutch member 238 is held disengaged from the driving clutch surface 236 by means of a compression spring 240 surrounding the cam shaft and interposed between the driven clutch member and a collar fixed to the cam shaft.

The hub of the driven clutch member 238 is provided with a cam groove 242 (see Fig. 30) which is engaged by a roll on one arm of a bell crank 244. The other arm of the bell crank extends over a vertically movable locking pin 246 (see Figs. 1 and 30) and is provided with a hole adapted to receive the locking pin when the locking pin is permitted to rise. The locking pin 246 is mounted in the rear end of a horizontally movable spring pressed slide or bolt 248 and is acted upon by a spring 250 which tends to raise the pin into engagement with the bell crank 244. While the machine is in operation the locking pin 246 is held depressed by connections actuated from the starting and stopping treadle comprising a roll 252 (see Fig. 1) upon an arm projecting from the main clutch controlling member 218 and a bell crank 254, one arm of which is provided with a cam surface engaged by the roll, and the other arm of which is connected to the lower end of the pin 246 by a link 256. While the machine is in operation, the locking pin 246 is held depressed and the bell crank 244 is oscillated idly by the cam groove 242. Upon release of the starting and stopping treadle to stop the machine, the control rod 224 moves upwardly to permit the members of the main driving clutch to be separated and the locking pin 246 is allowed to rise into engagement with the under surface of the bell crank 244. At a predetermined point in the revolution of the cam shaft, the hole in the bell crank registers with the pin and the pin enters the hole and locks the bell crank against movement. Continued rotation of the cam shaft causes the clutch member 238 to be moved into engagement with the clutch surface 236 on the reversely rotating gear 226, and thereafter by reason of the frictional engagement of the clutch surfaces, the cam shaft is slowed down, stopped and then reversely rotated to a predetermined point, at which point the clutch surfaces are separated to permit the cam shaft to come to rest. The cam shaft is thus brought to rest with the needle retracted from the work and free of the needle thread.

To stop the cam shaft with certainty in a predetermined position, a positive stop arm or movable follower acting on a cam fixed to the sewing cam shaft is provided. The follower, indicated at 258 (see Figs. 1 and 28) is mounted on the upwardly extending arm of a lever 260 pivotally mounted upon the shaft 178. During the reverse rotation of the cam shaft the follower 258 is yieldingly pressed against a cam disk 262 by a spring 264 (see Fig. 28) supported on the treadle connecting rod 224 and acting upon the rear end of a lever 266 pivotally mounted upon the shaft 178 and provided with a pin 268 arranged to engage an arm 270 projecting downwardly from the hub of the lever 260. The cam disk 262 is provided with a cam surface 272 inclined inwardly towards the center of the cam disk and with a lip portion 274 forming with the surface 272 a slot arranged to prevent the follower from entering except during reverse rotation of the cam shaft and to positively control the movement of the follower after it has once entered within the cam slot until the cam shaft has rotated in a forward direction through a sufficient angle to allow the follower 258 to clear the lip 274. The inner end of the slot forms a positive stop which is engaged by the follower 258 as the cam shaft reaches its final stopping position, the timing of the parts being such that the follower reaches the end of the slot immediately after the members of the slot speed reverse driving clutch have been disengaged. The pin 268 is moved out of contact with the arm 270 when the starting treadle is depressed to throw the main driving clutch into operation by an arm 275 extending downwardly from the clutch controlling member 218 into a position to engage and depress the lever 266 when the clutch controlling member is actuated to bring the members of the main driving clutch into engagement. The follower 258 is thus relieved of the pressure of the spring 264 as soon as the machine is started into operation and, during the sewing of the seam, is not pressed against the periphery of the cam disk 262.

During the operation of the stopping mechanism in stopping the machine, a positive swinging movement is imparted to the lever arm 260 by the slot in the cam disk 262. This positive swinging movement is utilized in the illustrated machine to retract the welt guide from the work and release the tension on the thread. Also, when the machine is started in operation, a swinging movement in the opposite direction is imparted to the lever arm 260 and this movement is utilized in the illustrated machine to lock the welt gripping and severing mechanism out of operation so that this mechanism cannot be accidentally thrown into operation while the machine is running.

To retract the welt guide as the machine stops, an arm 276 is provided projecting downwardly from the hub of the lever arm 260 and is arranged, as the lever arm 260 is actuated in stopping the machine, to engage a pin 278 on an arm projecting from the hub of the rear supporting link 110 for the welt guide carrier.

Tension on the sewing thread is normally controlled by the thread tension wheel 16 (see Figs. 1 and 31) of usual construction having a brake drum 280 engaged by a brake member 282. The brake member is pivotally mounted on one arm of a bell crank 284, the other arm of which is pivotally connected to a vertically arranged bolt 286. A compression spring 288 acting on an adjustable nut on the bolt forces the brake member against the drum 280 to produce the required tension on the thread. To release the brake member 282 from the drum 280 during the stopping of the machine, a rod 290 is provided, the lower end of which is connected to an arm 292 extending from the hub of the lever arm 260 and the upper end of which engages a finger 294 projecting downwardly from the hub of the bell crank 284.

The means for locking the welt gripping and cutting mechanism out of operation during the sewing of the seam comprises a U-shaped lug 296 extending from one side of the lever arm 260 and arranged when the lever 260 is swung outwardly in starting the machine to engage a pin 298 on an arm 300 fixed to the rock shaft 184 which carries the stop arm 196 (see Figs. 3 and 28). Actuation of the rock shaft 184 to throw the welt gripping and severing mechanism into operation while the machine is running is thus prevented. In stopping the machine, the inward movement of the lever arm 260 is sufficient to remove the U-shaped lug 296 from the pin 298 and thus free the rock shaft 184 for actuation by the operator.

The column upon which the head of the machine is supported is adjustable to suit the height of the operator and to this end is composed of a main base portion 302 and a tubular head supporting portion 304 fitting tightly into the upper end of the base. The head is bolted to the upper end of the support 304 and secured in its bottom wall is a flanged bushing 306 containing a roller thrust bearing which rests upon the upper end of a vertically arranged tubular shaft 308. This shaft, just below its upper end, is journalled in an inwardly projecting web of support 304 and below the web is provided with a threaded portion engaging a screw thread formed in the upper end of a tubular bracket 310, the lower end of which is fitted to a perforation in a web of the base 302 and rigidly secured thereto by a clamping nut 312. A gear 314 is formed on the upper end of the shaft 308 arranged to mesh with a worm gear 316 on a hand operated cross shaft 318 having a squared end extending outside of the support 304 so that the shaft may be readily rotated to raise or lower the head of the machine.

The treadle for controlling the main driving clutch comprises a lever 320 pivoted at its rear end on a gear casing 322 within and rigid with the base 302 and is acted upon by an elevating spring 324. A link 326 connects the treadle lever to the outer end of a short lever 328, the inner end of which is pivotally connected to and supports a vertically arranged rod 330. This rod extends upwardly inside the base 302 and tubular support 304 and through the bottom wall of the head where it engages the end of a short lever 332 (see Fig. 29) the other end of which is pivotally connected to the lower end of the main clutch controlling rod 224 hereinbefore referred to. To enable the effective length of the rod 330 to be adjusted to correspond with the height of the column, the connection between the lower end of the rod with the lever 328 comprises a block 334 pivotally mounted on the lever and having a screw threaded engagement with the rod. At its upper end the rod is provided with a splined portion having a sliding engagement with a gear 336 which is held from axial movement between the tubular support 304 and the bottom wall of the head and meshes with the gear 314 on the column adjusting shaft 308. The effective length of the rod 330 is thus adjusted automatically as the head of the machine is raised or lowered.

To enable the operator to throw the welt severing mechanism into operation, a knee lever 338 (see Fig. 32) is pivotally mounted beneath a table 340 secured to the base 302 and is formed with a rearwardly extending horizontal arm through which the rod 204 connected to the stop arm 196 passes, a yielding connection between the rod and the lever arm being provided by a spring 342 interposed between a collar on the rod above the spring and the rod and holding the lever arm against a collar on the rod below the lever arm. The vertical shaft 214 from which the cam shaft 14, the stopping mechanism and the welt severing mechanism are actuated, as hereinbefore described, is rotated continuously from a motor 344, mounted in the lower portion of the base 302. The motor is arranged with its armature or rotor axis horizontal, and in order to transmit motion to the vertical shaft 214 the armature shaft is coupled to a short horizontal shaft mounted in the gear casing 322 and having a bevel gear 348 secured thereto, meshing with a bevel gear 350 secured to the lower end of a vertical shaft section 352, having a bearing in the upper wall of the gear casing 322. The vertical shaft 214 has a bearing in the bushing 306 in the bottom wall of the head and extends downward through the hollow column adjusting shaft 308, and at its lower end has a telescoping connection with the shaft section 352. Provision is thus made for the automatic adjustment of driving connections between the motor and the head of the machine whenever an adjustment is made in the height of the head.

The novel features of construction embodied in the column of the machine form the subject-matter of a divisional application filed May 4, 1935, Serial No. 19,806.

The nature and scope of the invention having been indicated, and a machine embodying the several features of the invention having been specifically described, what is claimed is:

1. A chain stitch inseam shoe sewing machine having, in combination, a curved hook needle arranged to enter the work from the channel side and during its retracting stroke to exert a stitch tightening strain on the seam, a thread tension device, a take-up acting to draw tight a loop of thread around the shank of the needle while the needle is in the work and thereafter draw from the supply, through the tension device, an amount of thread varying with the thickness of the work, a needle threading looper, a thread finger acting to draw out a bight of thread between the work and the looper, and means for actuating the take-up and thread finger to give up to the needle, during its retracting stroke and after the needle enters the work, an amount of thread varying with the thickness of the work.

2. A chain stitch inseam shoe sewing machine having, in combination, a curved hook needle arranged to enter the work from the channel side and during its retracting stroke to exert a stitch tightening strain on the seam, a thread tension device, a take-up acting to draw tight a loop of thread around the shank of the needle while the needle is in the work and thereafter draw from the supply, through the tension device, an amount of thread varying with the thickness of the work, a needle threading looper, a thread finger acting to draw out a bight of thread between the work and the looper, spring means acting on the thread between the tension device and the work arranged to yield and give up thread during the retracting stroke of the needle, and means for actuating the take-up and thread finger to give up to the needle, during its retracting stroke and after the needle hook enters the work, an amount of thread varying with the thickness of the work.

3. A chain stitch inseam shoe sewing machine having, in combination, a curved hook needle arranged to enter the work from the channel side and during its retracting stroke to exert a stitch tightening strain on the seam, a thread tension device, a take-up acting to draw tight a loop of thread around the shank of the needle while the needle is in the work and thereafter draw from the supply through the tension device, an amount of thread varying with the thickness of the work, a needle threading looper, a thread finger acting to draw out a bight of thread between the work and the looper, spring means acting on the thread between the tension device and the work arranged to yield during the thread drawing action of the thread finger and during the retracting stroke of the needle, and means for actuating the take-up and thread finger to give up to the needle, during its retracting stroke, and after the needle hook enters the work, an amount of thread varying with the thickness of the work.

4. A chain stitch inseam shoe sewing machine having, in combination, a curved hook needle arranged to enter the work from the channel side and during its retracting stroke to exert a stitch tightening strain on the seam, a thread tension device, a take-up acting to draw tight a loop of thread around the shank of the needle while the needle is in the work and thereafter draw from the supply, through the tension device, an amount of thread varying with the thickness of the work, a needle threading looper, a thread finger acting to draw out a bight of thread between the work and the looper, spring means acting on the thread between the tension device and the work arranged to yield and give up thread during the thread drawing action of the thread finger, during the needle threading action of the looper, and during the retracting stroke of the needle, and means for actuating the take-up and thread finger to give up to the needle, during its retracting stroke, and after the needle hook enters the work, an amount of thread varying with the thickness of the work.

5. A chain stitch inseam shoe sewing machine having, in combination, a curved hook needle arranged to enter the work from the channel side and during its retracting stroke to exert a stitch tightening strain on the seam, a thread tension device, a take-up acting to draw tight a loop of thread around the shank of the needle while the needle is in the work and thereafter draw from the supply, through the tension device, an amount of thread varying with the thickness of the work, a needle threading looper, a thread finger acting to draw out a bight of thread between the work and the looper, a cam for actuating the take-up positively during its loop tightening and thread drawing movement, spring means acting on the take-up to permit it to yield and give up thread during the retracting stroke of the needle, and means for actuating the thread finger and take-up to give up to the needle, during its retracting stroke and after the needle hook enters the work, an amount of thread varying with the thickness of the work.

6. A chain stitch inseam shoe sewing machine having, in combination, a curved hook needle arranged to enter the work from the channel side and during its retracting stroke to exert a stitch tightening strain on the seam, a thread tension device, a take-up acting to draw tight a loop of thread around the shank of the needle while the needle is in the work and thereafter draw from the supply, through the tension device, an amount of thread varying with the thickness of the work, a needle threading looper, a thread finger acting to draw out a bight of thread between the work and the looper, a cam for actuating the take-up positively during its loop tightening and thread drawing movement, spring means acting on the take-up to permit it to yield and give up thread during the thread drawing action of the thread finger and during the retracting stroke of the needle, and means for actuating the take-up and thread finger to give up to the needle, during its retracting stroke and after the needle hook enters the work, an amount of thread varying with the thickness of the work.

7. A chain stitch inseam shoe sewing machine having, in combination, a curved hook needle arranged to enter the work from the channel side and during its retracting stroke to exert a stitch tightening strain on the seam, a thread tension device, a take-up acting to draw tight a loop of thread around the shank of the needle while the needle is in the work and thereafter draw from the supply, through the tension device, an amount of thread varying with the thickness of the work, a needle threading looper, a thread finger acting to draw out a bight of thread between the work and the looper, a cam for actuating the take-up positively during its loop tightening and thread drawing movement, spring means acting on the take-up to permit it to yield and give up thread during the thread drawing action of the thread finger, during the needle threading action of the looper, and during the retracting stroke of the needle, and means for actuating the take-up and thread finger to give up to the needle, during its retracting stroke and after the needle hook enters the work, an amount of thread varying with the thickness of the work.

8. A chain stitch inseam shoe sewing machine having, in combination, stitch forming devices including a curved hook needle arranged to enter the work from the channel side, a curved awl, mounted concentrically with the needle arranged to pierce the work from the opposite side, and overlap and support the point of the needle, and means for actuating the needle and awl to bring them into overlapping relation while the awl is through the work and maintain them in such relation until the point of the needle emerges from the work during its advancing stroke.

9. A chain stitch inseam shoe sewing machine having, in combination, stitch forming devices including a curved hook needle arranged to enter the work from the channel side, a curved awl arranged to pierce the work from the opposite side, and overlap and support the point of the needle, and means for actuating the needle and awl to bring them into overlapping relation while the awl is through the work and maintain them in such relation until the point of the needle emerges from the work during its advancing stroke.

10. A chain stitch inseam shoe sewing machine having, in combination, stitch forming and work feeding devices including a curved hook needle arranged to enter the work from the channel side, a curved awl arranged to pierce the work from the opposite side, and overlap and support the point of the needle, a carrier movable back and forth in the direction of feed upon which the awl is mounted, means for actuating the carrier, and means for actuating the needle and awl to bring them into overlapping relation while the awl is through the work and maintain them in such relation until the point of the needle emerges from the work during its advancing stroke.

11. A chain stitch inseam shoe sewing machine having, in combination, stitch forming devices includng a curved hook needle arranged to enter the work from the channel side, a curved awl arranged to pierce the work from the opposite side, and overlap and support the point of the needle, a welt guide arranged to present a welt with its stitch receiving groove in the path of the needle and awl, and means for actuating the needle and awl to bring them into overlapping relation while the awl is through the work and maintain them in such relation until the point of the needle emerges from the work during its advancing stroke.

12. A chain stitch inseam shoe sewing machine having, in combination, stitch forming devices including a curved hook needle arranged to enter the work from the channel side, a curved awl arranged to pierce the work from the opposite side, and overlap and support the point of the needle, a carrier movable back and forth in the direction of feed upon which the needle and awl are mounted to remain permanently in the same plane with relation to each other, means for actuating the carrier, and means for actuating the needle and awl to bring them into overlapping relation while the awl is through the work and maintain them in such relation until the point of the needle emerges from the work during its advancing stroke.

13. A chain stitch inseam shoe sewing machine having, in combination, a curved hook needle of small radius arranged to enter the work from the channel side and during its retracting stroke to exert a stitch tightening strain on the seam, a take-up acting to draw tight a loop of thread around the shank of the needle while the needle is in the work and exert a stitch setting strain on the seam, a looper, a thread finger engaging the thread between the work and the looper, and a welt guide, said needle being constructed and arranged to strike at the bottom of the channel of a shoe and emerge in the welt groove while clearing the insole surface inside of the channel to permit the needle loop around the shank of the needle to be drawn tightly against the channel lip of the insole by the take-up in setting the stitch.

14. A chain stitch inseam shoe sewing machine having, in combination, a curved hook needle of small radius arranged to enter the work from the channel side and during its retracting stroke to exert a stitch tightening strain on the seam, a take-up acting to draw tight a loop of thread around the shank of the needle while the needle is in the work and exert a stitch setting strain on the seam, a looper, a thread finger engaging the thread between the work and the looper, a curved awl of the same radius as the needle, mounted concentrically with the needle and arranged to enter the work from the side opposite the channel, means for actuating the awl to pierce the work for the passage of the needle, and a welt guide, said needle being constructed and arranged to strike at the bottom of the channel of a shoe and emerge in the welt groove while clearing the insole surface inside of the channel to permit the needle loop around the shank of the needle to be drawn tightly against the channel lip of the insole by the take-up in setting the stitch.

15. A chain stitch inseam shoe sewing machine having, in combination, stitch forming devices including a curved hook needle arranged to enter the work from the channel side, a channel guide, an awl arranged to enter the work on the side opposite the channel, and means for actuating said parts to impart a continuous feeding movement to the work.

16. A chain stitch inseam shoe sewing machine having, in combination, stitch forming devices including a curved hook needle arranged to enter the work from the channel side, a channel guide, a curved awl arranged to enter the work from the side opposite the channel, and mounted to remain permanently in the same plane with the needle, and means for actuating said parts to impart a continuous feeding movement to the work.

17. A chain stitch inseam shoe sewing machine having, in combination, stitch forming devices including a curved hook needle arranged to enter the work from the channel side, an awl arranged to enter the work on the side opposite the channel, a channel guide and mechanism for actuating said parts to impart a continuous feeding movement to the work comprising a carrier movable back and forth in the direction of feed upon which the awl is mounted, and a separate carrier movable back and forth in the direction of feed upon which the channel guide is mounted.

18. A chain stitch inseam shoe sewing machine having, in combination, stitch forming devices including a curved hook needle arranged to enter the work from the channel side, a channel guide, an awl arranged to enter the work on the side opposite the channel, and mechanism for actuating said parts to impart a continuous feeding movement to the work timed to backfeed the channel guide while the awl is in the work.

19. A chain stitch inseam shoe sewing machine having, in combination, stitch forming devices including a curved hook needle arranged to enter the work from the channel side, a channel guide, an awl arranged to enter the work on the side opposite the channel, and mechanism for actuating the parts to impart a continuous feeding movement to the work and to back-feed the channel guide while the awl is in the work, comprising a carrier movable back and forth in the direction of feed upon which the awl is mounted, and a separate carrier movable back and forth in the direction of feed upon which the channel guide is mounted.

20. A chain stitch inseam shoe sewing machine having, in combination, stitch forming devices including a curved hook needle arranged to enter the work from the channel side, a channel guide, a curved awl arranged to enter the work from the side opposite the channel and mounted to remain permanently in the same plane with the needle, a carrier movable back and forth in the direction of feed upon which the needle and awl are mounted, a separate carrier movable back and forth in the direction of feed upon which the channel guide is mounted, and means for actuating said carriers to impart a continuous feeding movement to the work.

21. A chain stitch inseam welt shoe sewing machine having, in combination, a curved hook needle arranged to enter the work from the channel side, a curved awl arranged to enter the work from the opposite side, a welt guide, welt gripping jaws movable towards the shoe at the completion of the seam to receive between them the welt and thread and clamp the welt while leaving the thread unclamped, a welt cutting knife arranged to pass beneath the thread and cut the clamped welt, and means for actuating the welt gripping jaws and knife.

22. A chain stitch inseam welt shoe sewing machine having, in combination, a curved hook needle arranged to enter the work from the channel side, a curved awl arranged to enter the work from the opposite side, a welt guide, welt gripping jaws movable towards the shoe at the completion of the seam to receive between them the welt and thread, one of said jaws being provided with a recess to prevent clamping of the thread, a welt cutting knife, and means for actuating the jaws and knife to clamp and cut the welt.

23. An inseam shoe sewing machine having, in combination, stitch forming devices including a curved needle, a welt guide movable towards and from the shoe, a welt guide carrier, supporting links for the carrier arranged to cause a portion of the welt guide to move in the same circular path as the needle, and an eccentric pivotal connection between one of the links and the welt guide carrier adjustable to vary the position of the welt guide with relation to the needle path.

24. An inseam shoe sewing machine having, in combination, stitch forming devices including a curved needle, a work rest movable towards and from the shoe, a longitudinally slotted work rest slide, ratchet teeth on the slide, a locking pawl, a spring urging the pawl towards the ratchet teeth, and a cam actuated rod extending through the slot in the work rest for moving the pawl away from the ratchet teeth.

25. An inseam shoe sewing machine having, in combination, stitch forming devices including a curved needle, a work rest, a work rest slide, ratchet teeth on the lower surface of the slide, a locking pawl, a spring urging the pawl towards the ratchet teeth, and a cam actuated rod for moving the pawl away from the ratchet teeth.

26. An inseam shoe sewing machine having, in combination, stitch forming devices including a curved needle, a work rest, a curved work rest slide extending rearwardly and downwardly from the work rest, ratchet teeth on the lower surface of the slide, a locking pawl, a spring urging the pawl towards the ratchet teeth, and a cam and connections for moving the pawl away from the ratchet teeth.

27. An inseam shoe sewing machine having, in combination, stitch forming devices including a curved needle, a work rest movable towards and from the shoe, a longitudinally slotted curved work rest slide extending rearwardly and downwardly from the work rest, ratchet teeth on the lower surface of the slide, a locking pawl, a spring urging the pawl towards the ratchet teeth, and a cam actuated rod extending through the slot in the work rest for moving the pawl away from the ratchet teeth.

28. An inseam welt shoe sewing machine having, in combination, stitch forming devices including a curved needle, a welt guide movable towards and from the shoe, a welt guide carrier, a work rest movable towards and from the shoe, a work rest carrier, ratchet teeth on the lower surface of the work rest carrier, ratchet teeth on the welt guide carrier, locking pawls to engage said ratchet teeth, means for actuating the locking pawl for the work rest slide to release the slide, and a connection between the pawls for simultaneously actuating the locking pawl for the welt guide slide to release the welt guide slide.

29. An inseam welt shoe sewing machine having, in combination, stitch forming devices including a curved needle, a welt guide movable towards and from the shoe, a welt guide carrier, a work rest movable towards and from the shoe, a work rest carrier, ratchet teeth on said carriers, locking pawls to engage the teeth on said carriers, a carrier for the work rest locking pawl, a carrier for the welt guide locking pawl, a spring acting on one pawl carrier to move both pawl carriers into locking position, a spring interposed between the pawl carriers, and a cam and connections acting on one pawl carrier to move both pawl carriers into unlocking position.

30. A chain stitch inseam shoe sewing machine having, in combination, a curved hook needle arranged to enter the work from the channel side, a take-up acting to draw tight a loop of thread around the shank of the needle while the needle is in the work, a looper, a thread finger, means for moving the thread finger inside the circle of the needle to draw out a bight of thread between the work and the looper, and means for moving the looper to thread the needle with thread leading from the thread finger directly outside of the circle of the needle.

31. A chain stitch inseam shoe sewing machine having, in combination, a curved hook needle arranged to enter the work from the channel side, a take-up acting to draw tight a loop of thread around the shank of the needle while the needle is in the work, a looper, a thread finger, means for moving the thread finger radially towards the center of the needle circle and across the plane of the needle to draw out a bight of thread between the work and the looper, and means for moving the looper across the plane of the needle outside of the circle of the needle to thread the needle.

32. A chain stitch inseam shoe sewing machine having, in combination, a curved hook needle, arranged to enter the work from the channel side, a take-up acting to draw tight a loop of thread around the shank of the needle while the needle is in the work, a curved awl arranged to enter the work from the side opposite the channel, and mounted to remain permanently in the same plane with the needle, a looper, a thread finger, means for moving the thread finger radially towards the center of the needle circle and towards the plane of the needle to draw out a bight of thread between the work and the looper, and means for moving the looper across the plane of the needle outside of the circle of the needle to thread the needle.

33. A chain stitch inseam shoe sewing machine having, in combination, a curved hook needle arranged to enter the work from the channel side, a take-up acting to draw tight a loop of thread around the shank of the needle while the needle is in the work, a looper, a thread finger, a pair of levers, a three cornered support carrying the thread finger at one corner and having its other corners connected respectively to said levers, means for independently oscillating said levers to move the thread finger radially towards the center of the needle circle and towards the plane of the needle to draw out a bight of thread between the work and the looper, and means for moving the looper across the plane of the needle outside of the circle of the needle to thread the needle.

34. An inseam shoe sewing machine having, in combination, a curved hook needle, a needle carrier, a support in which the needle carrier is mounted to oscillate and to slide back and forth in the direction of feed, a needle guide mounted to oscillate on the same axis as the needle carrier, a plate mounted on the carrier at one side of the needle guide to slide therewith, but held from rotation by said support, a ball mounted in a perforation extending through the needle guide parallel to the axis of the needle carrier, recesses in the needle carrier and plate to receive the ball and lock the needle guide alternately to the needle carrier and plate, and means for causing the ball to lock the needle guide to the plate during the latter portion of the work piercing stroke and first portion of the retracting stroke of the needle and to lock the needle guide to the needle carrier during the latter portion of the retracting stroke and first portion of the work piercing stroke of the needle.

35. An inseam welt shoe sewing machine having, in combination, starting and stopping mechanisms, stitch forming devices, welt severing mechanism, a member arranged to be engaged and moved by the operator, connections from said member for rendering said welt severing mechanism operative, and devices actuated in starting for preventing the actuation of said connections during the sewing and actuated in stopping to permit the actuation of said connections.

36. A chain stitch inseam shoe sewing machine having, in combination, a curved hook needle of small radius arranged to enter the work from the channel side and during its retracting stroke to exert a stitch tightening strain on the seam, a curved awl arranged to pierce the work from the opposite side and overlap and support the point of the needle, a take-up acting to draw tight a loop of thread around the shank of the needle while the needle is in the work and exert a stitch setting strain on the seam, a looper, a thread finger engaging the thread between the work and the looper, a welt guide, said needle being constructed and arranged to strike at the bottom of the channel of a shoe and emerge in the welt groove while clearing the insole surface inside of the channel, and means for actuating the needle and awl to bring them into overlapping relation while the awl is through the work and maintain them in such relation until the point of the needle emerges from the work during its advancing stroke.

37. A chain stitch inseam shoe sewing machine having, in combination, a curved hook needle arranged to enter the work from the channel side, a take-up acting to draw tight a loop of thread around the shank of the needle while the needle is in the work, a looper, a thread finger, means for moving the thread finger radially towards the center of the needle circle and across the plane of the needle to draw out a bight of thread between the work and the looper, and means for moving the looper to thread the needle.

ALFRED R. MORRILL.